(12) United States Patent
Kemp

(10) Patent No.: US 9,015,213 B2
(45) Date of Patent: Apr. 21, 2015

(54) LEGAL RESEARCH SYSTEM

(75) Inventor: Richard Douglas Kemp, Atlantic City, NJ (US)

(73) Assignee: The Bureau of National Affairs, Inc., Arlington, VA (US)

( * ) Notice: Subject to any disclaimer, the term of this patent is extended or adjusted under 35 U.S.C. 154(b) by 1214 days.

(21) Appl. No.: 10/991,965

(22) Filed: Nov. 17, 2004

(65) Prior Publication Data

US 2005/0278633 A1    Dec. 15, 2005

Related U.S. Application Data

(60) Provisional application No. 60/520,905, filed on Nov. 17, 2003, provisional application No. 60/576,935, filed on Jun. 4, 2004.

(51) Int. Cl.
*G06F 12/00* (2006.01)
*G06F 17/30* (2006.01)
*G06F 3/0481* (2013.01)
*G06F 3/0482* (2013.01)

(52) U.S. Cl.
CPC ........ *G06F 17/30011* (2013.01); *G06F 3/0481* (2013.01); *G06F 3/0482* (2013.01); *G06F 17/30643* (2013.01); *G06F 17/30728* (2013.01); *G06F 2203/04803* (2013.01)

(58) Field of Classification Search
USPC .................. 709/205, 245, 201; 715/206, 209; 707/726, 830
See application file for complete search history.

(56) References Cited

U.S. PATENT DOCUMENTS

| | | | | |
|---|---|---|---|---|
| 6,026,388 | A  * | 2/2000  | Liddy et al. | 1/1 |
| 6,111,579 | A    | 8/2000  | Alimpich et al. | |
| 6,199,098 | B1 * | 3/2001  | Jones et al. | 709/203 |
| 6,240,410 | B1 * | 5/2001  | Wical | 1/1 |
| 6,380,957 | B1   | 4/2002  | Banning | |
| 6,418,429 | B1 * | 7/2002  | Borovoy et al. | 1/1 |
| 7,275,061 | B1 * | 9/2007  | Kon et al. | 1/1 |
| 7,302,444 | B1 * | 11/2007 | Dunmore et al. | 1/1 |
| 8,346,751 | B1 * | 1/2013  | Jin et al. | 707/708 |

(Continued)

FOREIGN PATENT DOCUMENTS

WO    WO 01/13273    2/2001

OTHER PUBLICATIONS

Cooper W.J.: "The Design Patterns Java Companion" Internet Addison-Wesley Design Patterns Series 2 Oct. 1998 (Oct. 2, 1998), pp. 2-218, retrieved from the Internet: URL: http://www.patterndepot.com/put/8/DesignJava.PDF [retreived on May 27, 2010].

*Primary Examiner* — Dhairya A Patel
(74) *Attorney, Agent, or Firm* — Jon E. Gordon; Frommer Lawrence & Haug LLP

(57) ABSTRACT

Methods, systems, and user interfaces for accessing, retrieving, storing, and presenting information stored in computer readable media. Information stored on a computer readable media may be searched using selectable items representing an index of information. In response to selection of one of the selectable items, information is presented which is related to the selected item, concurrently with display of the index and at least one least one previously-selected item in a hierarchical display. The invention has particular application to the legal field, but is also applicable to other fields, e.g., accounting, medicine, business and finance, engineering, scientific fields, merchandising fields, fulfillment fields, inventory fields, etc.

16 Claims, 18 Drawing Sheets

(56) References Cited

U.S. PATENT DOCUMENTS

| | | | |
|---|---|---|---|
| 2001/0049677 A1* | 12/2001 | Talib et al. | 707/3 |
| 2002/0059395 A1 | 5/2002 | Liou | |
| 2002/0138475 A1 | 9/2002 | Lee | |
| 2002/0169764 A1* | 11/2002 | Kincaid et al. | 707/3 |
| 2003/0195877 A1 | 10/2003 | Ford et al. | |
| 2006/0095300 A1* | 5/2006 | Schrier et al. | 705/3 |

* cited by examiner

LEGAL RESEARCH SYSTEM

CROSS-REFERENCE TO RELATED APPLICATIONS

The present application claims the benefit under 35 U.S.C. §119(e) from provisional patent applications Nos. 60/520,905, filed Nov. 17, 2003, entitled Legal Research System and 60/576,935, filed Jun. 4, 2004, entitled Legal Research System, the disclosures of which are incorporated by reference herein in their entirety. This application further incorporates by reference the entire disclosures of prior co-owned U.S. provisional patent application Ser. No. 60/392,061, filed Jun. 25, 2002, entitled Electronic Management and Distribution of Legal Information; and prior co-owned U.S. patent application Ser. No. 10/603,207, filed Jun. 25, 2003, entitled Electronic Management and Distribution of Legal Information; prior co-owned U.S. patent application Ser. No. 10/045,586, filed Nov. 1, 2002, entitled Dynamic Legal Database Providing Historical and Current Versions of Bodies of Law.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

The invention relates to obtaining, e.g., searching (including navigational aspects of searching), accessing, retrieving and/or presenting, information stored in computer readable media, and/or to storing information in computer readable media, and to systems, methods, user interfaces and computer programs for doing so. The invention has application to the legal and other fields. From an end user standpoint, the invention relates to searching for information stored in computer readable media and presenting the results of searches, e.g., on at least one computer display device.

Westlaw, Lexis/Nexis, Matthew Bender, the Bureau of National Affairs and others provide computerized legal research systems.

SUMMARY OF THE INVENTION

The invention provides for obtaining, e.g., searching (including navigational aspects of searching), accessing, retrieving and/or presenting, information stored in computer readable media, and/or for storing information in computer readable media. Embodiments of the invention include systems, methods, user interfaces and computer program products for such obtaining and/or storing of information. Embodiments of the invention provide for presenting information stored on computer readable media and/or searching for information stored on computer readable media and presenting results of searches, e.g., via a user interface.

As mentioned, the invention has particular application to the legal field, and the information referred to herein may comprise legal information. However, application of the invention is not limited to the legal field, and the invention has application to other fields, e.g., professional fields such as accounting, medicine, business and finance, engineering, scientific fields, merchandising fields, fulfillment fields, inventory fields, etc. Those of ordinary skill in the relevant arts will know of these and other applications of the invention from the disclosure of this application.

Information searched and/or obtained using embodiments of the invention may be stored according to various schema, including hierarchical schemes such as topic trees, relational databases, file systems or structured document systems (e.g., using Extensible Markup Language (XML)). Stored information items may be associated with one another in various ways, including linking (e.g., hyperlinking), through the use of pointers, or by including information in single files, records or documents. A hierarchical arrangement of hyperlinked, structured documents can collectively provide a table of contents or topical index, or index for a particular subject, or list. Use of the term "index" herein is meant in a broad sense, and unless the context indicates otherwise, may refer to one or more types of indices, including, but not limited to, topical indices and tables of contents. Similarly, the term "list" is used herein in a broad sense, and unless the context indicates otherwise, may refer to an index and may encompass a hierarchical list.

In accordance with an embodiment of the invention, information is stored in a structured document system created, e.g., with a markup language such as XML or Hypertext Markup Language (HTML). Lower and higher level structured documents are provided which are cross-indexed or linked, e.g., hierarchically. One or more higher-level structured documents include information relating to a plurality of lower-level structured documents that are in a hierarchical relationship with a respective higher-level document. At least one higher-level document may include a table of contents ("TOC") and/or a topical index including a reference to a lower level document or documents associated therewith. At least one higher level document may include a topical index and/or TOC having a reference to one or more other higher level documents and to one or more lower level documents which are referenced by any of the plurality of higher level documents.

In an embodiment, documents containing information that can be obtained using the invention are stored in a database in XML format and rendered into HTML by an application server for distribution to client computers that execute browser software. Documents may be delivered in XML format to client computers having a plug-in or other such interpreters in order to interpret the XML specification. Other kinds of markup languages may also be employed in practice, and other types of client devices may be used. Furthermore, the database could be stored on a CD-ROM or the like and directly accessed by client computers or other devices. In all of these embodiments, it will be understood that the database is stored on a computer readable medium which is operatively connected to a computer or to a computer system, comprising one or more processors, devices or computers, which controls storage, access, retrieval and/or presentation information from the database.

For example, a topical index of a legal or other subject, or a portion of such an index, is presented which can be searched, e.g., by browsing or navigation, to present various topics and subtopics (hereinafter collectively "topics") within the index, and to present, in conjunction with the index, results of the search in the form of lower level information stored in one or more databases related to topics selected from the index. Results of the search presented in conjunction with the index may be presented concurrently with the index, and may be presented separately from the index or together with the index, as for example as an embedded portion of the index.

Previously selected information (e.g., the next higher level information that was selected in a particular search or query, or in a previous search or query, or in the current or a previous search session, unlimited by time or within a predetermined time before the present location within the index was searched, etc.), for example, an item in an index or TOC, or a search query, etc., may be presented in selectable form with lower level information presented, e.g., as a result of a search query or queries or a navigation through an index to, e.g., facilitate backtracking or returning to an earlier point in a search, or to a higher level in an index. Selecting a presented, previously selected information can facilitate, e.g., navigation and/or further searching. This assists in maintaining or indicating, at a higher level than a particular level reached in a search, previous navigation and/or search query or queries in a particular search, etc.

In one embodiment, information stored on a computer readable medium or media (which are referred to herein simply as "media" unless the context indicates otherwise) is searched and/or presented with the aid of a computer. In this embodiment, a plurality of selectable items (e.g., selectable from a display on a display device by an input device such as a mouse or other pointing device, keyboard, etc.) in more than one level of a first index of information stored in the computer readable media is presented, e.g., displayed on at least one display device, concurrently with at least one selectable item in the first index not included in the plurality of selectable items or from a second index. The plurality of selectable items and the at least one selectable item are preferably presented without indication of the relationship between the at least one selectable item and the plurality of selectable items. For example, the plurality of items may be presented in a vertical arrangement and the at least one selectable item may be presented separately from the plurality of selectable items. In an embodiment in which the at least one selectable item comprises two or more items, the two or more selectable items may be presented in a horizontal arrangement, e.g., above the vertical arrangement of the plurality of selectable items.

In response to selection of an item of the first plurality of selectable items, information is presented which is related to the selected item of the first plurality of items while the first plurality of items and the at one least selectable item are concurrently presented. In response to selection of the at least one selectable item, a second plurality of selectable items, in the first index or in the second index, that is at least partially different from the first plurality of selectable items is presented while concurrently presented is at least one other selectable item that was previously selected during searching of the information stored on the computer readable media conducted within a predetermined time or in a predetermined prior search or searches, e.g., in the same or a prior search or presentation session. For example, selection of an item of the at least one selectable item causes navigation back in a search or index (topical index, TOC, etc.) or to a higher level in a search or index than that represented by the plurality of items, and selection of an item of the plurality of items causes navigation forward in a search or index or to a lower level in a search or index or to information stored in the computer readable media which the navigation or search seeks.

In another embodiment, a plurality of selectable items of a plurality of levels of an index of information stored in a computer readable media are presented, and concurrently therewith, at least one selectable item that was previously selected during a search of the information. The at least one selectable item may be from the same or a different index than the plurality of selectable items and is not included in the displayed items of the plurality of selectable items. In response to selection of one of the presented items of the plurality of selectable items, presenting information related to the selected item while concurrently displaying the items of the plurality of selectable items and the at least one selectable item, or in response to the selection of the at least one selectable item, presenting another plurality of selectable items, at least partially different from the displayed items of the plurality of items while concurrently presenting at least one other selectable item that was previously selected during the search of the information stored on the computer readable media.

A method of presenting information stored on computer readable media with the aid of a computer, e.g., via a search, according to an embodiment of the invention, comprises displaying on at least one display device selectable items from a plurality of levels of an index of legal information stored in computer readable media, in response to selection of one of the selectable items by a user, displaying on the at least one display device, concurrently with the selectable items, information associated with the selected one of the items, and displaying at the at least one display device, concurrently with and in addition to the selectable items and the displayed information, a hierarchical index of selectable items representing previously-selected levels of the index.

A method of presenting information stored on computer readable media with the aid of a computer, e.g., via a search, in accordance with an embodiment of the invention, comprises displaying concurrently on at least one display device a first display comprising selectable items from a plurality of levels of an index of legal information stored in a computer readable medium or media, information associated with a selected one of the items, and a hierarchical index consisting of selectable items representing previously-selected levels of the index; displaying on the at least one display device, in response to a selection of a second selected one of the items, a second display, the second display comprising a plurality of selectable items representing at least a portion of the index of legal information corresponding to the second selected one of the items, information associated with the second selected one of the items, and a hierarchical index consisting of selectable items representing previously-selected levels of the index, including the first selected one of the items; and displaying on the at least one display device, in response to a selection of one of the items of the hierarchical index, a third display comprising a plurality of selectable items representing at least a portion of an index of legal information corresponding to an index item corresponding to the selected item of the hierarchical index, and information associated with the index item corresponding to the selected indicia.

A method of presenting information stored on computer readable media with the aid of a computer, e.g., via a search, in accordance with an embodiment of the invention, comprises: displaying at the user station selectable items corresponding to topics of an index of legal information; and identifying for inclusion in terms of a search query an identifier corresponding to a topic corresponding to a selected one of the selectable items, in response to selection of the corresponding item.

A method of presenting information stored on computer readable media with the aid of a computer, e.g., via a search, in accordance with an embodiment of the invention, comprises: displaying on at least one display device selectable items of an index of legal information stored in a computer readable medium or media; in response to selection of one of the selectable items, displaying on the at least one display device, concurrently with the selectable items, information associated with the selected one of the items and from at least two sources, stored in at least two databases, of at least two types, or from at least two documents; and displaying at the at least one display device, concurrently with and in addition to the selectable items and the displayed information, a hierarchical index of selectable items representing previously-selected levels of the index.

A method in accordance with an embodiment of the invention of presenting information, e.g., legal information, stored on computer readable media on at least one display device with the aid of a computer and an input device for selecting information displayed on the at least one display device, comprises, in a presentation session: displaying on at least one display device a first plurality of selectable items in more than one level of a first index of information stored in the computer readable media; and displaying on the at least one display device, concurrently with displaying the first plurality of selectable items, at least one selectable item in the first index not included in the plurality of selectable items or in a second index. If an item of the first plurality of selectable items is selected while the first plurality of selectable items and the at least one selectable item are displayed, then information is displayed on the at least one display device related to the selected item of the first plurality of items while concurrently displaying the first plurality of items and the at one least selectable item. If the at least one selectable item is selected while the first plurality of selectable items and the at least one selectable item are displayed, a second plurality of selectable items is displayed on the at least one display device, in the first index or in the second index, that is at least partially different from the first plurality of selectable items, while concurrently displaying on the at least one display device at least one other selectable item that was previously selected in the presentation session.

In accordance with an embodiment of the invention, a method of presenting results on at least one display device of a search for legal information stored on computer readable media with the aid of a computer and an input device for selecting information displayed on the at least one display device, comprises, in a presentation session: displaying on at least one display device a plurality of selectable items from a plurality of levels of an index of legal information stored in computer readable media; in response to selection of one of the plurality of selectable items, displaying on the at least one display device, concurrently with the plurality of selectable items, information associated with the selected one of the plurality of items; and displaying on the at least one display device, concurrently with and in addition to the plurality of selectable items and the displayed information, a hierarchical index of selectable items representing levels of the index previously selected in the session. A source or sources of the information displayed and an indicator associated with each displayed source indicating a number items of information of a respective source related to the selected item may be displayed in association with the information displayed related to the selected item of the first plurality of items. The at least one selectable item may comprise a plurality of items in a hierarchical first or second index consisting of items previously selected in the session. The information related to the selected item of the first plurality of items may comprise a summary of at least one document stored in the computer readable media. At least some of the displayed information may be updatable with updated information in accordance with an embodiment, and in response to selection of the displayed updatable information or an item related to the displayed updatable information, the displayed information is updated with the updated information.

A method of presenting legal information stored on computer readable media on at least one display device with the aid of a computer and an input device for selecting information displayed on the at least one display device, according to an embodiment of the invention, comprises: displaying concurrently on the at least one display device a first display comprising selectable items from a plurality of levels of an index of legal information stored in a computer readable media, information associated with a selected one of the items, and a hierarchical index of selectable items representing previously-selected levels of the index; displaying on the at least one display device, in response to a selection of a second selected one of the items, a second display, the second display comprising a plurality of selectable items representing at least a portion of the index of legal information corresponding to the second selected one of the items, information associated with the second selected one of the items, and a hierarchical index of selectable items representing previously-selected levels of the index, including the first selected one of the items; and displaying on the at least one display device, in response to a selection of one of the items of the hierarchical index, a third display comprising a plurality of selectable items representing at least a portion of an index of legal information corresponding to the selected item of the hierarchical index.

A method of presenting information stored on computer readable media on at least one display device with the aid of a computer and an input device for selecting information displayed on the at least one display device, in accordance with an embodiment of the invention, comprises: displaying on at least one display device a first display comprising selectable items from a plurality of levels of an index of information stored in a computer readable media, the selectable items including a first selected one of the items; displaying on the at least one display device information associated with the selected one of the items, the information including at least one selectable item representing an item other than the first selected one of the items, and of the same or another index; and displaying at the user station, in response to a selection of the at least one selectable item of the same or another index, at least a portion of the same or the other index including the second selected item.

A method is provided in accordance with an embodiment of the invention of presenting on at least one display device legal information stored on computer readable media, including documents containing primary legal information and documents containing secondary legal information, with the aid of a computer and an input device for selecting information displayed on the at least one display device. The method comprises: displaying on at least one display device a plurality of selectable items representing at least a portion of an index of legal information; in response to a selection of one of the selectable items, displaying on the at least one display device, concurrently with the selectable items, links to documents containing primary legal information and links to documents containing secondary legal information.

A method of presenting legal information stored on computer readable media on at least one display device with the aid of a computer and an input device for selecting information displayed on the at least one display device, in accordance with an embodiment of the invention, comprises: displaying on the at least one display device a plurality of selectable items corresponding to topics of an index of legal information; in response to selection of a displayed selectable item, providing a search query that includes an identifier for a topic corresponding to the selected item; and performing a search based on the search query; and displaying on the at least one display device results of the search.

A method is provided in accordance with an embodiment of the invention of presenting on at least one display device legal information stored on computer readable media, including information stored in at least two databases, with the aid of a computer and an input device for selecting information displayed on the at least one display device. The method comprises: displaying on at least one display device selectable items of an index of legal information stored in a computer readable media; in response to selection of one of the selectable items, displaying on the at least one display device, concurrently with the selectable items, information associated with the selected one of the items from the at least two databases; and displaying on the at least one display device, concurrently with and in addition to the selectable items and the displayed information, a hierarchical index of selectable items representing previously-selected levels of the index.

A method is provided in accordance with an embodiment of the invention of presenting results on at least one display device of a search for legal information stored on a computer readable media, including information of at least two source types, with the aid of a computer and an input device for selecting information displayed on the at least one display device. The method comprises: displaying on at least one display device selectable items of an index of legal information stored in a computer readable media; in response to selection of one of the selectable items, displaying on the at least one display device, concurrently with the selectable items, information of the at least two source types associated with the selected one of the items; and displaying on the at least one display device, concurrently with and in addition to the selectable items and the displayed information, a hierarchical index of selectable items representing previously-selected levels of the index.

A method is provided in accordance with an embodiment of the invention for retrieving and displaying information stored on media readable by a computer system which includes at least one display device and at least one input device for selecting information displayed on the at least one display device. The method comprises: displaying in a first display a list of selectable items each of which representing a source of information stored in the media; displaying in a second display for one or more items selected from the list representing sources to be included in a search query enterable into a third display area; and displaying in the third display an entered search query. The first, second and third displays being displayed concurrently and the computer system performs a search of sources displayed in the second display based on a search query displayed in the third display.

A method is provided in accordance with an embodiment of the invention for retrieving and displaying information stored on media readable by a computer system which includes at least one display device and at least one input device for selecting information displayed on the at least one display device. The method comprises: displaying in a first display a list of selectable items each of which represents items of information stored in the media; storing in the media at least one summary of each stored item of information, and for a plurality of items of information and storing a plurality of summaries each of which relates to a selectable item of a different list; displaying in a second display an entered search query. The computer system performs a search of information stored in the media corresponding to one or more items selected from the list displayed in the first display based on the search query displayed in the second display, and displays in a third display a summary of an item of information, if any, stored in the media responsive to the search query, the displayed item of information being a summary related to the selected item of the displayed list if more than one summary is stored for an item of information. The first, second and third displays are preferably concurrently.

A method in accordance with an embodiment of the invention for retrieving and displaying information stored on media readable by a computer system which includes at least one display device and at least one input device for selecting information displayed on the at least one display device. The method comprises: displaying on the at least one display device a hierarchical list of selectable items; in response to selection of an item in the list, displaying on the at least one display device as part of an expanded hierarchical list that includes at least part of the hierarchical list, one or more lower level selectable items, and if there are none, displaying a list of selectable documents containing information related to the selected item, if any, the list of selectable documents being positioned relative to at least a part of the hierarchical list to indicate a relationship between the list of documents and the selected item. The list of documents may be displayed in a scrollable or page format.

Information may also be presented in a user interface in accordance with an embodiment of the invention as follows. One or more selectable items, in a first index or a second index of information stored in the computer readable medium or media is displayable on at least one display device. At least one of the one or more selectable items is associated at a lower level with at least one of a plurality of selectable items stored in the computer readable media which are displayable on the at least one display device concurrently with and separate from the one or more selectable items. Lower level information stored on the computer readable media, if any, related to a respective item of the plurality of items, is displayable on the at least one display device concurrently with and separate from the one or more selectable items and the plurality of selectable items. A displayed first plurality of selectable items is in more than one level of the first index, and at least one of the displayed first plurality of items is related at a higher level to at least one displayed item of the one or more selectable items and at a lower level to at least one displayed lower level information, if any.

In another embodiment, the invention provides a user interface of a computer system for retrieving and displaying information stored on computer readable media. The user interface comprises a display on at least one display device of a plurality of selectable items in more than one level of a first index of information stored in the medium or media, at least one of the plurality of selectable items being hierarchically related with lower level information stored in the medium or media, and with higher level information stored in the medium or media. The user interface also comprises a display on the at least one display device concurrently with and separate from the plurality of selectable items of lower level information stored in the medium or media hierarchically related to a selected item of the plurality of items, and a display on the at least one display device concurrently with and separate from the plurality of selectable items and the lower level information of selectable higher level information stored in the medium or media hierarchically related to one or more of the plurality of selectable items in the first index not included in the displayed plurality of selectable items.

The user interface, in response to selection of displayed higher level information, may display a plurality of selectable items stored in the medium or media of which at least one is hierarchically related to the selected higher level information, and in response to selection of an item of the displayed plurality of selectable items, may display lower level information stored in the medium or media hierarchically related to the selected item, if any.

A user interface in accordance with an embodiment of the invention comprises a display concurrently of the following on at least one display device: a plurality of selectable items in more than one level of a first index of information stored in the medium or media, at least one of the plurality of selectable items being hierarchically related with lower level information stored in the medium or media, and with higher level information stored in the medium or media; lower level information stored in the medium or media hierarchically related to a selected item of the plurality of items; and selectable higher level information stored in the medium or media hierarchically related to one or more of the plurality of selectable items in the first index not included in the displayed plurality of selectable items. The user interface in response to selection of displayed higher level information, displays a plurality of selectable items stored in the medium or media of which at least one is hierarchically related to the selected higher level information, and in response to selection of an item of the displays plurality of selectable items, displaying lower level information stored in the medium or media hierarchically related to the selected item, if any.

A user interface of a computer system, in accordance with an embodiment of the invention, for retrieving and displaying information stored on media readable by the computer system which includes at least one display device and at least one input device for selecting information displayed on the at least one display device, comprises displays of information on the at least one display device including: a display of a plurality of selectable items in more than one level of a first index of information stored in the media, at least one of the plurality of selectable items being hierarchically related with lower level information stored in the media, and with higher level information stored in the media; a display concurrently with and separate from the plurality of selectable items of lower level information stored in the media hierarchically related to a selected item of the plurality of items; and a display concurrently with and separate from the plurality of selectable items and the lower level information of selectable higher level information stored in the media hierarchically related to one or more of the plurality of selectable items in the first index not included in the displayed plurality of selectable items. The user interface, in response to selection of higher level information displayed in a display on the at least one display device, displaying on the at least one display device a plurality of selectable items stored in the media of which at least one is hierarchically related to the selected higher level information, and in response to selection of an item of the plurality of selectable items displayed in a display on the at least one display device, displaying on the at least one display device lower level information, if any, stored in the media hierarchically related to the selected item.

A user interface, according to an embodiment of the invention, of a computer system for retrieving and displaying information stored on media readable by the computer system, which includes at least one display device and at least one input device for selecting information displayed on the at least one display device, comprises displays of information on the at least one display device including: a first display for a list of selectable items each of which representing a source of information stored in the media; a second display for one or more items selected from the list representing sources to be included in a search query enterable into a third display; and the third display for an entered search query. The user interface displays the first, second and third displays concurrently, and the computer system performing a search of sources displayed in the second display based on a search query displayed in the third display.

The information and items may be displayed in two or more user interface areas or two or more windows on the same or a plurality of display devices.

The plurality of selectable items can represent all or any portion of topics within an index. In an embodiment, displayed items may comprise relevant portions of topical lists of key words describing one or more areas, e.g., of law or otherwise related to the legal field, or of other subjects. Examples of indexes suitable for use with the invention comprise, for example, legal topical indexes such as the West Key Number system and the legal topics lists used by Lexis/Nexis, and portions thereof. Such indexes can include hierarchical arrangements of terms describing a subject, classified into one or more levels, ranks, or classes of subtopics. In embodiments of the invention using such indexes, one or more subordinate levels of a topic may be displayed in response to selection of an item, such as a link or other icon representing the topic itself, or another item, including for example a graphic symbol, associated with such an item.

Selectable items suitable for use in implementing the invention include any symbols and devices presentable by a computer system and useable by a user of the computer system for selecting or identifying or otherwise designating a topic for further action, including for example icons and other graphical devices, and hypertext, uniform resource locator (URL), or other address-related links, and other text-based devices, representing topics within an index, which may designated for use in processing through the use of a mouse or other pointing device.

Information presented in response to selection of a selected item can include any information suitable for the purposes disclosed herein, including identifying content, such as the names of source(s), date(s), content(s), or other attributes of information associated with the index items, and content. For example, selection of an term from an index (or topical index or TOC) can result in display of a list of documents, including the titles of or citations to documents classified within the index as belonging or otherwise related to the selected topic; summaries of the contents of such documents; all or a portion of the contents of such documents; or indications of the source(s) of and/or date(s) associated with the publication, creation, etc., of such documents. The information may displayed, for example, in the form of text strings with or without graphic devices, and may comprise selectable links to other or related information, such as full-text content associated with displayed titles or summaries.

In an embodiment of the invention relating to the legal field, information presented upon selection of an item, e.g., in an index, may comprise both primary and secondary legal materials. Primary legal materials may include sources of law, such as for example statutes, written opinions of courts, and administrative rules. Secondary materials may include legal analysis such as law review or other interpretive articles, news articles, and other non-binding legal commentary. In such embodiments, a plurality of selectable items representing at least a portion of an index of legal information is presented, and concurrently therewith, information associated with a selected one of the items which may include both primary and secondary legal information.

Another search or navigation feature according to an embodiment of the invention is that of browsing an index to find information associated with an index topic, accessing content related to the information, and using an item embedded in or otherwise associated with the information content to navigate to an index item different than the first, for example a related topic in the same index or an item in a separate index. An embodiment of the invention includes displaying at a user station a first display comprising a plurality of selectable items representing at least a portion of an index of legal information, the portion including a first selected one of the items; displaying at the user station, concurrently with the index or otherwise, information associated with the selected one of the items, the information including at least one selectable indicia representing an index item other than the first selected one of the items; and displaying at the user station, in response to a selection of the at least one selectable indicia, at least a portion of the index including the item represented by the indicia.

Searching, in accordance with an embodiment of the invention, information stored on a computer readable media with the aid of a computer, comprises the display on at least one display device of a first plurality of selectable items in more than one level of a first index of information stored in the computer readable medium or media. These items may, e.g., be from a hierarchical table of contents or topical index or list at more that one level thereof. Also displayed on the at least one display device concurrently with the plurality of items is at least one selectable item in the first index not included in the plurality of selectable items or from a second index. The at least one item may. e.g., be from a higher level of the first index as an aid to navigate back in a topical search, or a related item in another index. In response to selection (e.g., using an input device) of an item of the first plurality of selectable items, information is displayed on the at least one display device related to the selected item of the first plurality of items while concurrently displaying the first plurality of items and the at one least selectable item. This displayed information may, e.g., be information at a hierarchically lower level that the selected item. In response to the selection of the at least one selectable item, a second plurality of selectable items is displayed on the at least one display device, which is from the first index or the second index, and is at least partially different from the first plurality of selectable items. This information may, e.g., be from a hierarchically higher level, and also is displayed concurrently with at least one other selectable item that was previously selected during searching of the information stored on the computer readable medium or media conducted within a predetermined time or in a predetermined prior search or searches.

A selectable indicator may be displayed in association with the information displayed related to the selected item of the first plurality of items indicating that the information displayed is updatable, and comprising, in response to selection of the selectable indicator, displaying information related to and more recent than the information displayed, if any.

A source or sources of the information may be displayed in association with the information related to the selected item of the first plurality of items, and an indicator may be displayed associated with each displayed source indicating a number items of information related to the information displayed the source includes.

The at least one selectable item described above may comprise a plurality of items in a hierarchical first or second index or list consisting of items previously selected during searching of the information stored on the computer readable medium or media conducted within a predetermined time or in a predetermined prior search or searches. The information related to the selected item of the first plurality of items may comprise a summary of at least one document stored in the computer readable medium or media.

In an embodiment, presented information includes information of an updateable type, and the method comprises displaying at the user station, concurrently with the displayed information, an item identifying the type and selectable for use in requesting delivery of updated information of the updateable type. For example, if the presented information includes news reports, statutes, case law, or other types of legal information which is sometimes revisited or updated, the user may request that new or revised information available to the search system be provided to the user on a push basis by selecting a suitable graphic element or other icon.

In an embodiment, presented information includes an indication of a number of items of information (sometimes called "hits" by searchers) related to a selected index topic that are available from a source or group of sources. For example, the selection of an index item might result in the presentation of information indicating that a certain number of documents are available from a certain source, such as a news source, publisher, or database. Selection of the information item or a related item can provide a further listing or content of the documents available from the source. In this embodiment, presented concurrently with the selectable items is at least one source of the presented information associated with the selected one of the items, and a number of presentable information items available from the source identified as associated with a node (e.g., of a tree) represented by a selected one of the items.

In an embodiment, presented information is provided together with, or otherwise in conjunction with, means for rapidly and efficiently retrieving the information once it has been identified, for example in response to a search query. For example, information may be displayed together with a selectable item enabling a user to "bookmark" the information for later retrieval or other processing by, for example, associating labels, other identifying text, or other identifiers with the information.

In an embodiment the invention also provides improved means for adding terms appearing in legal or other topic indexes to terms used in text-based and other searches. For example, radio buttons or other icons are presented in association with index terms, so that upon selection of the icons, or in some embodiments selection of the index terms themselves, the index terms, or related identifiers, are added automatically, by the searching system, to terms for a text-based or other search. Thus some embodiments of the invention include displaying at the user station selectable items corresponding to topics of an index of legal information; and identifying for inclusion in terms of a search query an identifier corresponding to a topic corresponding to a selected one of the selectable items, in response to selection of the corresponding item.

Embodiments of the invention provide the information stored in the computer readable media hierarchically arranged or linked or referenced, etc. However, information may be stored other than in hierarchical arrangements.

In a preferred embodiment, presenting comprises displaying in at least one display device, e.g., in user interface area or areas, or window or windows, the selectable items and information disclosed herein.

In a preferred embodiment, the information stored on the computer readable media relates to the legal field, and within the legal field, to specific areas of law such as securities law, bankruptcy law or patent law.

Systems implementing the invention may comprise one or more user stations, e.g., each including one or more display devices on which the information and items disclosed herein may be displayed, a processor or computer device and an input device. A user station may be a stand alone device, which has access to local computer readable storage media in which the information and items disclosed herein are stored, e.g., on a hard disc or a CD-ROM or DVD, etc. One or more user stations may also be configured to access computer readable storage media via a local or remote network, e.g., a LAN, WAN, etc. Private or public communication systems may be used to communicate over such networks. Methods provided by the invention may be carried out using such systems, computer readable storage media and networks.

The invention also provides computer media to carry out the functionality on a computer or computer system the functionality disclosed herein, and a computer and computer systems programmed to carry out the functionality disclosed herein.

Additional aspects of the present invention will be apparent in view of the description which follows.

BRIEF DESCRIPTION OF THE DRAWINGS

The invention is illustrated in the figures of the accompanying drawings, which are meant to be exemplary and not limiting, and in which like references are intended to refer to like or corresponding parts.

DETAILED DESCRIPTION OF THE PREFERRED EMBODIMENTS

Figure 1:
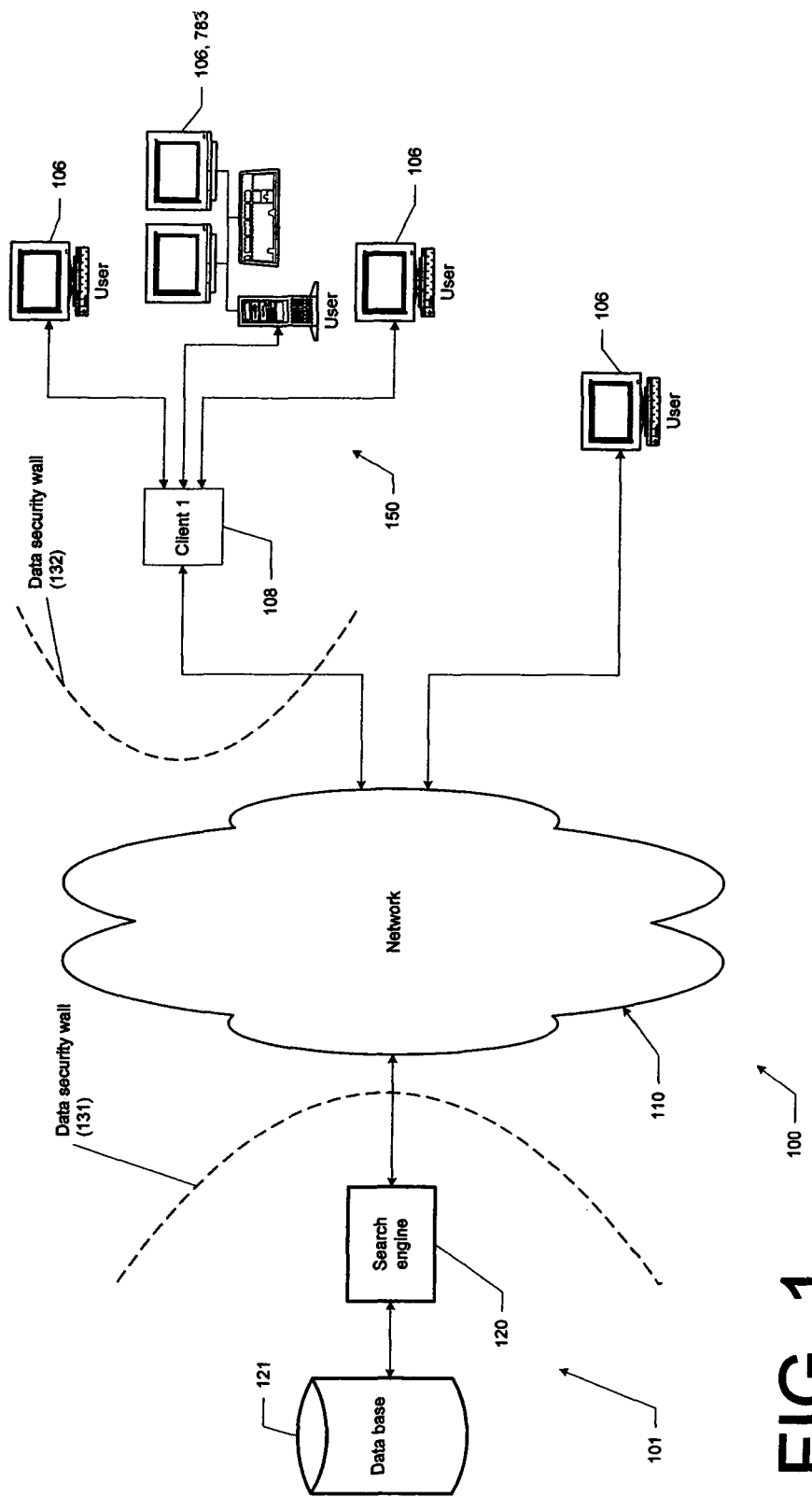
FIG. 1 is a schematic diagram of an embodiment of a system for presentation of results of searches for legal information according to the invention.

FIG. 1 is a schematic diagram of an embodiment of a system for use in performing research, and in particular for presentation of results of searches for legal information, according to the invention. Such a system is suitable for use, for example, by a large number of users, who may be geographically dispersed.

Referring to FIG. 1, legal research system 100 comprises a server 101 and one or more user stations 106 linked by a communications network 110. In system 100, one or more researchers can enter at user stations 106 research requests which are communicated to and processed by server 101. Information responsive to the requests is identified by server 101, as for example from information stored in computer readable media in database(s) 121, and returned to the respective user station(s) 106, and displayed on display devices, such as user interface screens, associated with the user station(s).

Server 101 can include one or more search engines 120 and databases 121. Search engine(s) 120 process search and other requests from user stations 106, identify responsive information in database(s) 121, and forward responsive data to the requesting user stations. Database(s) 121 store information and other data, including for example data used in building topical indexes of information stored in the database(s), to be identified in response to requests from user station(s) 106, in volatile or non-volatile memory, and provide access to the data by search engine(s) 120.

User stations 106 provide display devices and other interfaces for the input and output of information by and to researchers, including research requests and responses thereto, and provide any other functionality required for meeting user research needs. They may, for example, provide for local storage and processing of search results, including printing of researched information, forwarding of information by e-mail, and incorporation of such information into local documents through the use of word processors. User stations 106 can comprise input devices such as keyboards, and pointing/selecting devices such as mouses and trackballs. User stations 106 can comprise stand-alone computers such as individual desktop personal computers (PCs), or may be linked in one or more client networks 150 such as wide or local area networks (WANs or LANs). User systems 150 can be configured for use by administrative and other special classes of users, and may comprise client servers 108 for administering user system functions.

Display devices provided by user stations 106 can comprise one or more single- and/or multi-panel cathode ray tube (CRT), light emitting diode (LED), liquid crystal (LCD), and/or other displays, together with other hardware or software suitable or required for providing user interfaces adapted for implementation of the invention described herein, including for example graphical user interface screens as described herein. In FIG. 1 user system 106, 783 comprises a plurality of displays.

Network 110 facilitates communications between user station(s) 106 and server(s) 101. Network 110 and any client networks 150 comprise any useful or required communications networks, such as the Internet and/or any combinations of LANs and WANs, or other public or private electronic communications networks (ECNs), wireless or otherwise, including any line or telecommunications facilities for linking networks through security firewalls or other devices, and routers and the like. Many suitable systems are now known, and will doubtless hereafter be developed.

Server 101, search engine 120, databases 121, client networks 150, and user stations 106 can comprise any computers or other data processing devices, including volatile or non-volatile information storage devices comprising any suitable computer readable medium or media, suitable for the purposes described herein, in any numbers and of any types. Many such devices are known, and will doubtless hereafter be developed. The selection of suitable devices and combinations of devices, and the implementation of systems suitable for accomplishing the purposes described herein, will be well within the ability of those having ordinary skill in the relevant art, once they have been made familiar with this disclosure.

The invention may also be implemented on stand-alone user systems such as desktop PCs or other workstations, without connection to servers or other processors by any networks or other communications devices.

FIGS. 2, 3, and 5-7 are schematic representations of user interface screens that may be provided by a research system 100 for use in searching information stored on a computer readable medium or media with the aid of a computer in accordance with the invention. Such screens may be presented, for example, on a display device at a user station 106 during processing of search requests by a user of a research system according to the invention. The figures illustrate display and browsing of an index of legal information, concurrent display of information associated with selected index items, and other features of the invention.

Figure 2:
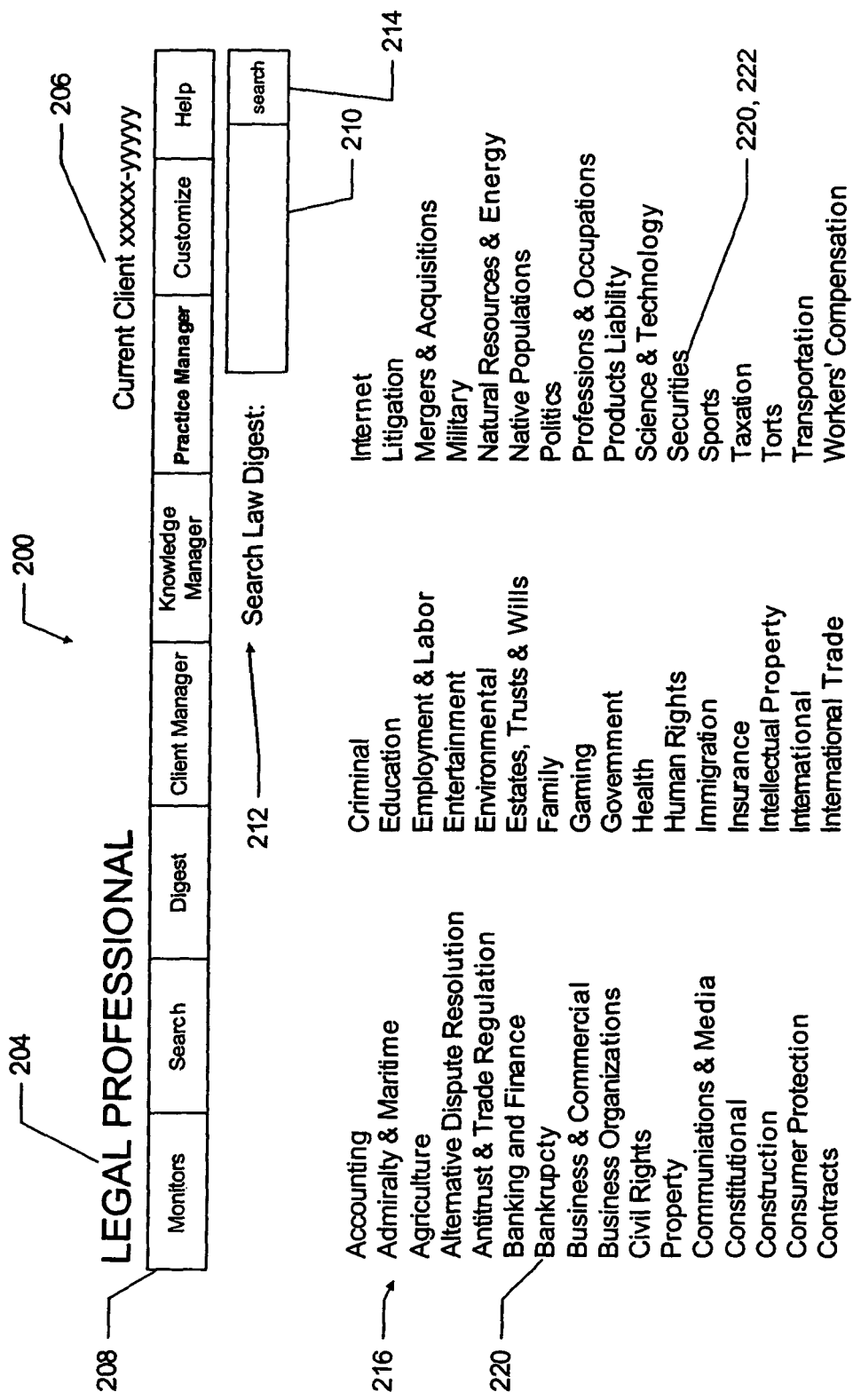
FIGS. 2, 3, and 5-7 are schematic diagrams of user interfaces comprising data displayed at a user station according to embodiments of the invention.

Screen 200 of FIG. 2 illustrates an introductory user interface presented at a user station 106. The type of screen shown in FIG. 2 can be presented, for example, at a user's display device upon initiation of a search session using a topical index to conduct legal research. Such an interface can be presented, for example, following user log-on to a secure research system, and following selection of an index-searching option from an introductory page offering a number of search and administrative functions. Suitable log-on and introductory processes and interface screens are described in the incorporated references, and are otherwise well known in the arts. The type of log-on and introductory processes implemented as a condition of obtaining display of a screen such as that shown in FIG. 2 will depend, as will be apparent to those skilled in the arts, upon the purposes and objectives of the search system, it's operators and its users.

Screen 200 of FIG. 2 comprises header 204, which can include a system identifier such as a trade name or service mark, and which displays at 206 an optional reference entered by the user for tracking billing and other information.

Menu bar 208 includes displays of selectable items representing a number of functions offered by the research system for accomplishing search and administrative tasks. The items are illustrated in the form of selectable icons sometimes called buttons. As is well understood in the relevant arts, selection of such a button on a user interface display, using an input device such as a mouse or trackball, can be used to start or otherwise invoke a functional task or application. Included in menu bar 208 are a "Monitors" button for use in reviewing news and other current awareness information; a "Search" button for starting a text-based or other search function; and "Client Manager," "Knowledge Manager," "Practice Manager," "Customize," and "Help" buttons for performing administrative and other tasks. Examples of the implementation and operation of monitoring, search, and administrative tasks are described in the incorporated references.

Also included in Menu Bar 208 is a "Digest" button. Selection of the Digest button from the illustrated screen or from another screen, such as an introductory screen or a monitoring or search interface screen, causes a request for activation of an index-based search function to be sent from the user station 106 from which the request is being made to search engine 120. Search engine 120 then compiles or retrieves from one or more databases 121 at least a portion of an index describing the subject area to be searched, and causes data suitable for use in presenting the display to be sent to the requesting user station. The user station displays the interface screen, including a whole or partial index, on at least one display device, in for example a manner such as that shown in FIG. 2.

In some embodiments, an initial request from a user station 106 causes all or part of a highest-level index of the subject area to be displayed at the user station, with any items of lower or subordinate levels of the index hierarchy being reserved from view. This can, for example, help a user review a relatively broad portion of the index, and improve the ease and quality of the index searching process.

In the example shown in FIG. 2, a complete, high-level index 216 of legal topics entitled "Law Digest" is displayed. Index 216 comprises a number of selectable items 220, in the form of hypertext links to data comprising addresses and/or instructions for use by search engine 120 in guiding and facilitating index-based searching of database(s) 121. Any selectable item 220 of index 216 can comprise links to one or more data stores or instructions. For example, selection of a single selectable item 220 can cause search engine(s) 120 to search database(s) 121 for and/or display information associated with the selected index topic, to identify items in subordinate levels of index 216 associated with the selected topic, and to execute other search functions such as changing the display of the index on the requesting user's interface screen.

A user at a user station 106, being presented with an interface screen such as that shown in FIG. 2, can select a desired index topic in order to browse a more-detailed portion of the index, and/or in order to view information related to the topic, by for example placing a cursor over an item representing the topic on the screen using a mouse or other pointing device, and activating an associated switch. Activation of the switch causes a message to be sent from the user's station 106 to search engine 120, and a suitable instruction to be executed by the search engine, to provide, for example, an expanded index portion including the selected index topic. Such techniques for selecting items and instructing computers are well understood, and incorporating such functionality in implementing the various processing functions of the invention will not trouble those of ordinary skill in the art, once they have been made familiar with this disclosure.

In the example shown in FIG. 2, index 216 comprises a listing of topics of an index of the subject "Legal Digest". Forty-eight top-level topic items 220, from "Accounting" to "Workers' Compensation", are displayed. No levels of the index subordinate to the 48-topic top level are displayed.

In the example shown in FIG. 2, the user is also provided a capability of searching the index 216 and/or information associated with the index and topics thereof, including any hidden or reserved portions of the index, including, for example, subtopics not currently shown in the user's display, using keywords or other terms. For example, a user can select field 210 using the cursor and a pointing device, enter one or more key words in the field using a keyboard, and activate a search of the index by selecting "search" item 214. By doing so, the user causes user station 106 to send to search engine 120 a request for a search of the index for the indicated terms. The system may then return a list of index items including some or all of the terms entered by the user. Selection of one of the listed index items by the user may then result in presentation of an interface comprising a selected portion of the index related to the selected topic, with or without information associated with the index term, in the manner herein described.

Figure 3:
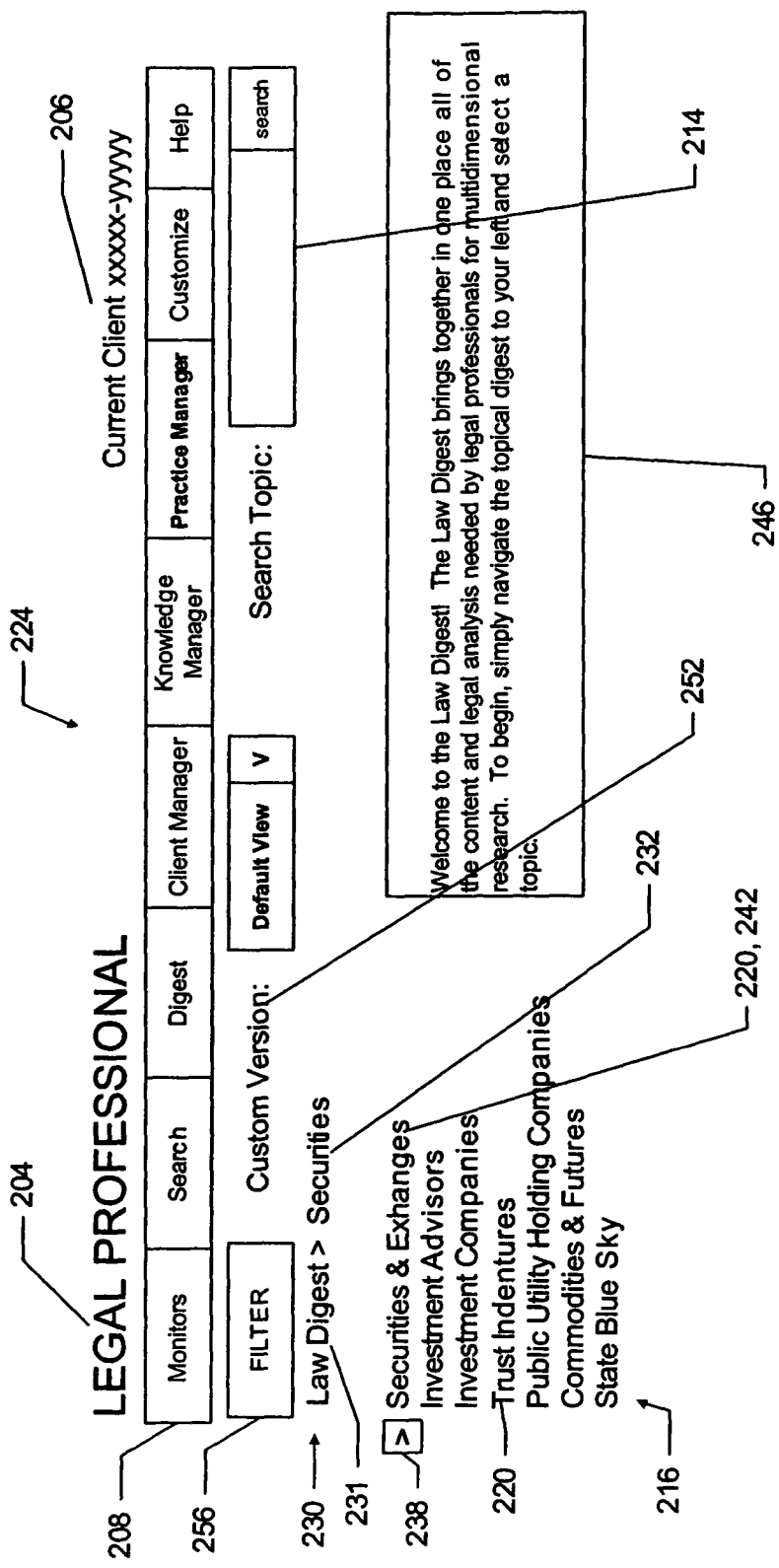

Selection of an item 220 such as "Securities" item 222 from (first) index 216 of interface 200 results in the presentation on one or more display devices at user station 106 of one or more user interface screens showing content such as that depicted in screen 224 of FIG. 3.

Figure 4:
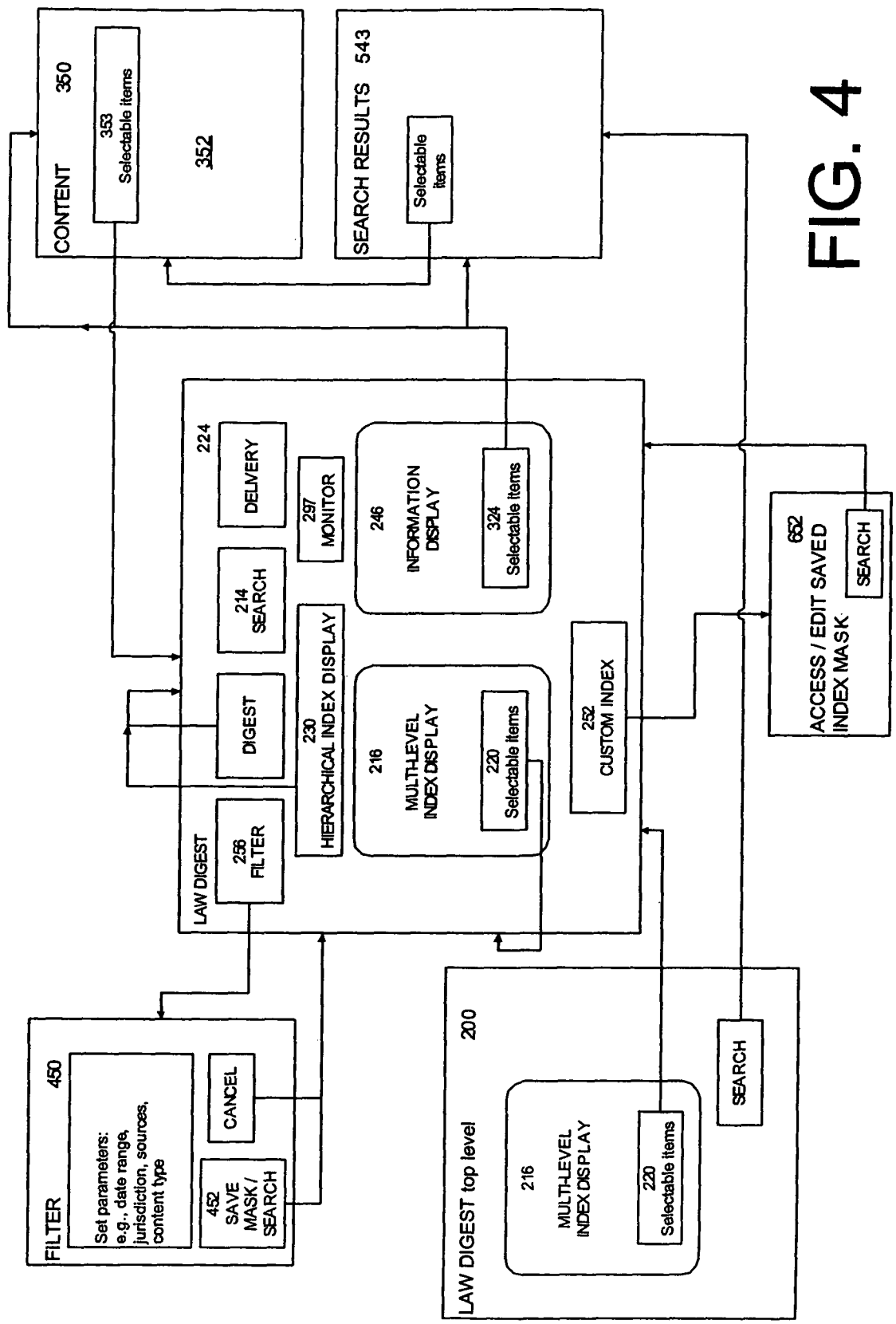
FIG. 4 is a schematic diagram of process flows for presentation of user interface screens according to embodiments of the invention.

Example relationships and process flows between various functions and interface screens that can be used by system 100 in searching for information stored, for example, in database(s) 121 are illustrated in FIG. 4, to which reference may be made in respect of the discussion which follows. FIG. 4 illustrates, for example, relationships which may be made between an interface such as screen 200 illustrated in FIG. 2; screen 224, which is illustrated in FIG. 3, and various other user interface screens.

With reference to FIG. 4, a schematic diagram of a user interface screen 200 such as that illustrated in FIG. 2 is shown. User interface screen 200 comprises an index display 216, such as that shown in FIG. 2, which can include one or more selectable items such as items 220 representing topics of an index displayed on the screen 200. Selection of a topic item 220 from display 216 results in presentation of a user interface screen 224, such as that shown schematically in FIG. 4 and illustrated in FIG. 3.

User interface screen 224 of FIG. 3 comprises header 204, client reference 206, menu bar 208, and index 216, as described above in reference to FIG. 2. The screen also provides, inter alia, a FILTER function button 256, which a user may employ to filter presentation of index 216 and any displayed information associated with a selected one or more topics 220 of index 216, using desired parameters; Custom Version or Custom Index selection item 252, which a user may employ to access and edit filter or search settings for controlling display and search of the index; and Search function 212, which a user may employ to search index 220 and/or information stored in database(s) 121 for desired terms or term fragments.

In the example shown in FIG. 3, index 216 comprises a plurality of selectable items 220 representing topics of the "Legal Digest" index of a first level subordinate to the top-level "Securities" item shown in FIG. 2, the topics ranging from "Securities & Exchanges" to "State Blue Sky." A single level of subtopics is displayed. In some embodiments of the invention an index display may comprise more items than may be displayed at one time on the user interface screen; scroll bars and other devices for displaying and/or selecting additional objects may be used to facilitate review of additional index items.

Horizontal arrow item 238 or other indicator displayed adjacent to selectable item "Securities & Exchanges" 242 indicates that the topic "Securities & Exchanges" of the index "Law Digest" includes one or more subordinate levels, or sub-topics, and that the selectable item "Securities & Exchanges" is associated with one or more corresponding displayable and selectable index items, in one or more levels of the index. Selection of item 238 results in expansion of the displayed portion 216 of the index to include selectable items from at least the next subordinate level of the index, as shown and described in FIG. 5 and below.

Selection of an item 220 such as item 242 "Securities & Exchanges" associated with item 238, and in some embodiments selection of item 238, can result in display in information display portion 246 of interface 224 of information associated with the index item 242, if any associated information exists in database(s) 121, as explained herein. In the interface screen illustrated in FIG. 3, news or important notices are listed until a selection of a topic having associated information is made.

The interface screen of FIGS. 3 and 4 also displays, concurrently with and in addition to selectable items 220 of index 216 and any information displayed at screen portion 246, at 230 a hierarchical index consisting of selectable items 231, 232 representing previously-selected levels of the index. The hierarchical index is useful, for example, in tracking an index search and for navigating between levels of the searched index. In the example illustrated, the display indicates that the current search began in the index "Law Digest", and that the top-level topic "Securities" has been selected for further searching. This progression is represented by presentation of items 231 and 232, respectively. Selection of either item 231 or 232 causes suitable requests to be sent to search engine 120 to cause display at 216 of at least a portion of the index level corresponding to the selected item. Display of a corresponding portion of the index upon selection of one an item displayed in hierarchical index 230 can cause a currently-displayed portion of index 216 to be replaced by a portion of the index corresponding to the selected item. For example, selection of "Law Digest" item 231 results in display of all or at least a portion of the top-level index shown in FIG. 2, and selection of item 232 can result in display of the portion of the index level immediately subordinate to "Securities," as shown in FIG. 3. Selection of either of items 231, 232 also can result in display at screen portion of 246 of information stored in database(s) 121 associated with the selected item.

Selection of an expansion item 238 such as that shown in FIG. 3 results in display of an expanded portion of (second) index 216 corresponding to one or more levels of topics subordinate to the topic with which the expansion item 238 is associated. For example, as shown in FIG. 5, index portion 216 of FIG. 5 comprises a plurality of selectable items 220, including each of subtopic items 220 from the single-level index 216 shown in FIG. 3, and in addition selectable items 292 representing topics of the next subordinate level of the index associated with the topic "Securities & Exchanges." Further selectable horizontal arrow expansion items 238 are associated with selectable items 220, 240, "Definitions" and "Exemptions." Selection of one of items 238 can also result in display of information associated with the corresponding index items 220, 292 (e.g., subtopics related to "Definitions" or "Exemptions."

In some embodiments the invention comprises, in response to the selection of at least one selectable item, displaying on at least one display device associated with the user's station a plurality of selectable items, e.g., in the form of an index 216, while concurrently displaying on the at least one display device at least one other selectable item that was previously selected during searching of information stored on the computer readable medium or media such as database(s) 121, wherein the search was conducted, i.e., the previously-selected item was selected, within a predetermined time prior to the selection of the index item, or in a predetermined prior search or searches, etc. For example, in some embodiments display of selectable items in a hierarchical index representing one or more previously-selected items is limited to items selected within a predetermined time period, such as within the last hour, day, or week; or within a current search session, or within a predetermined number of search sessions, or within a retrieved, previously-stored search. For example, if an item was selected in a search conducted during a previous search session, following which the searching user logged off of or otherwise terminated a search session using a system 100, and initiated a new search or search session, the previously-selected item may or may not be displayed, depending upon the purposes and objectives of the user and/or the search system. By either or not imposing time or previous-search constraints, search techniques available to the system users can be significantly refined and improved. In some embodiments, a choice of whether to impose such limits may be made by the user, or set by the system, as an overridable or firm default.

Figure 5:
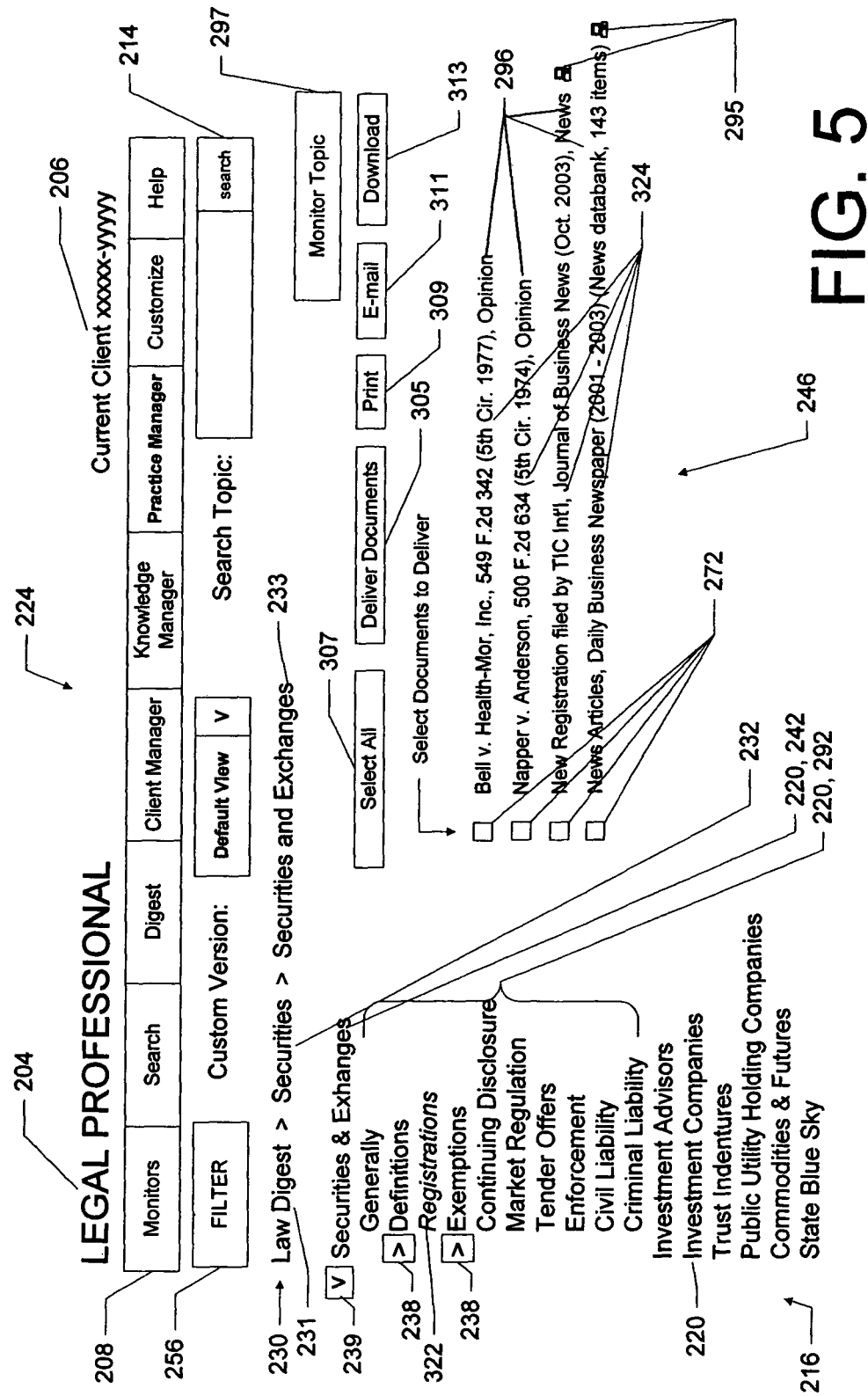

As shown in FIGS. 3, 4, and 5, selection of an item 220 or 238 can result in refreshing of all or at least an index display portion 216 of user interface screen 224 to include items from the expanded level(s) of the index 216. Such refreshing, as described, thus can result in display of a second index that is at least partially different from a first display of selectable items, i.e., the first index 216. For example, selection of an item 242 in FIG. 3 can result in refreshing of the display of a first index 216 to display a second index 216 as shown in FIG. 5.

In various embodiments the invention can support concurrent display of either a limited or unlimited number of hierarchical levels of index 216. In some embodiments concurrent display of a limited number of hierarchical levels is supported, as for example 2 or 3 levels, so that expansion of a topic of a lowest displayed level causes the display to change so that only two or three levels of the index are displayed, and thus in the removal from the screen of a highest displayed level of the index, as may be seen in FIGS. 2 and 3. Display of a limited, yet plural, number of index levels provides significant advantages, including the conservation of display screen space while retaining improved browsing and/or search control by the user. When more topics or subtopics have been requested than may be displayed at one time in the screen space allowed, scroll bars and other devices for permitting review and access of items in undisplayed items may be used.

Down or expanded arrow 239 (FIG. 5) associated with the expanded, now relatively upper-level topic "Securities & Exchanges" 220, 242 indicates that that topic is expanded in the current display, at least to the level of the next-lowest level of the index. Selection of a down arrow 239 associated with an expanded topic can cause the display to "collapse" the index display, so that subordinate index topics associated with the expanded topic are removed from the display and adjacent same-level topics are restored to immediate juxtaposition. For example, selection of expanded arrow 239 corresponding to topic "Securities & Exchanges" of FIG. 5 can result in removal of subordinate topic items 292 from the display, so that the index display 216 returns to the form shown, for example, in FIG. 3, in which items "Securities & Exchanges" and "Investment Advisors" are adjacent to each other in the display.

Selection of an index item 220 (FIG. 5) can result in display in index display portion 246 of interface 224 of any information stored in database(s) 121 related to or otherwise associated with the item 220. For example, selection of item 322 "Registrations" causes a request to be sent from user station 106 to search engine 120 for a search for information items associated with the term "Registrations", and results in display of a plurality of information items 324, which include judicial opinions related to the subtopic "Registrations" of topic "Securities & Exchanges" in top-level topic "Securities" in the index "Law Digest." For example, a request can cause search engine 120 to review all or some of the information items stored in database(s) 121 for data items comprising suitable tags, fields, or other identifiers, using, for example, hypertext mark-up language (HTML) or extensible mark-up language (XML) protocols and coding. When many information items related to a topic are included in searched database(s) 121, a first portion of a listing may be displayed in screen portion 246, along with a Windows-style scroll bar or other user interface device for providing display and/or access to remaining items.

As shown in FIGS. 4 and 5, selection of a selectable item 220 in index display 216 causes at least partial refreshing of interface 224, which can include refreshing of information display portion 246 to include information items associated with the selected index item 220.

In some embodiments of the invention, a requesting user may refine the results of his search, or otherwise control display of information items 246, by using FILTER button 256 and/or Search Topic item 214 illustrated in FIGS. 3 and 5 and shown schematically in FIG. 4. In such embodiments a user may, for example, activate FILTER item 256 by selecting it using a pointing device as herein described, resulting in display of an interactive menu item 450 (FIG. 4) facilitating entry of filter parameters such as date ranges, sources, legal jurisdictions, etc. to be used as filters in screening information displayed at information display portion 246 in response to selection of an index item 220. Upon entry of an execution command, as for example by selection of a "SAVE MASK/SEARCH" button 452 from the interactive FILTER menu displayed as a result of selection of item 256, a command is sent to the responsible processor, such as search engine(s) 120, to filter displayed information items using tags or other data associated with information items in accordance with the entered filter criteria. Interface 224 is re-presented, with corresponding information items displayed in information display portion 246.

In some embodiments a user may be offered, by selecting FILTER item 256, an opportunity to save defined sets of filter parameters, or filter masks. By selecting an item such as SAVE MASK/SEARCH item 452 the user can cause the search query, or mask, to be saved in non-volatile storage, for example at one or more user stations 106 or at server 101, optionally with the user being offered an opportunity to associate a tag or label with the saved filter parameter set, or otherwise name it.

A user can also search information items associated with a selected topic by, for example, entering keywords or other search terms, including, for example, Boolean or other logical operators, in the input field of Search Topic item 214 of FIGS. 3-5. Use of Search Topic item 214 in this fashion results, for example, in searching by search engine(s) 120 or other processors of database(s) 121 for information items comprising content or identifiers corresponding to the entered search terms. Results displayed at 246 of filtered requests and or term searches are limited accordingly. Filter- and term-search functions such as those provided through use of items 256, 214, can be provided for use as separate and/or shared search tools, depending upon the goals and requirements of the search system 100 and its users.

Selection of an item 292 such as "Registrations" also can result in display in hierarchical index 230 of a selectable item 233 representing the index level above the level of the selected item, e.g., the most recently-selected or next-highest level of the index above the currently-selected topic. For example, selection of "Registrations" item 292 in FIG. 5 results in display of item 233 "Securities & Exchanges" in hierarchical index 230, with higher-level topic items 233 "Securities" 232 and 231 "Law Digest."

A currently-selected item in index display 216 and/or in hierarchical index 230 can be denoted by changing the appearance of the item relative to other, unselected items in the display. For example, in the example illustrated in FIG. 5, selection of item 322 "Registrations" is denoted by display of the item in italicized text. Notation may also be effected by changing font size, style, color, or in any other suitable fashion.

Information items 324 accessed in response to searches initiated by selection of one or more index items 220, and displayed concurrently with index items 220 and hierarchical index items 230, can be of any type and/or form suitable for meeting the search requirements of the requesting user and/or the information storage and search system. For example, in the example illustrated in FIGS. 4 and 5, information items 324 comprise or are displayed in the form of selectable links to data files or data sets stored in database(s) 121. The selectable links 324 display the titles and formal citations of two legal opinions issued by a court, a title and citation to a news article from a business journal, and a reference to a set of news articles from a news information databank. Selection of one of selectable items 324 can cause the system 100 to access content associated with the displayed item 324. The target data files can contain, for example, the full text or other content of identified or otherwise related documents, such as the full texts of opinions, articles, listings, etc. Information items 324 can also, or alternatively, comprise, for example, summary or full-text content of items associated with selected index topics, graphical representations of content or of information types, or any other identifiers or content forms.

Information items 324 may be displayed, as shown in FIG. 5, with indicators 296 indicating the type and/or amount of information identified as responsive to the search query or otherwise available in database(s) 121. Indicators may be provided to indicate any desired characteristics of displayed information items. For example, in the interface illustrated in FIG. 5, indicators 296 indicate that two of the displayed information items are of a type pertaining to legal opinions, one of a type pertaining to an article from a business news journal, and one of a type pertaining to a collection of articles from a newspaper. In some embodiments, for example, where database(s) 121 comprise multiple, independently-named databases or other information sources, indicators 296 can include an indication of the database(s) or other sources in which information associated with the selected index topic can be found, and a number indicating the number of information items, such as news articles, analytical reports, or case opinions that are available within the identified sources. For example, indicator 296 corresponding to the set of articles from the "Daily Business Newspaper" indicates that the articles are stored in a database 121 entitled "News databank," and that the set currently includes 143 information items associated with index topic 322, "Registrations". Indications may also be given of other characteristics, such as for example the legal jurisdiction or geographic area in which legal documents such as the opinions, articles, etc., 272 shown in FIG. 5 originated, or to which they pertain, in addition to any indications given in the selectable item.

The two information items 324 shown in FIG. 5 pertaining to news articles are displayed with selectable indicators 295 indicating that the information items are of an updateable type. Indicators 295 indicate that the information items with which they are displayed belong to a type or class of information items to which new items relevant to the current search, or otherwise associated with the selected index topic 322, are sometimes added. For example, the item 324 "News Articles", which at the time the information was accessed for display comprised 143 articles related to the topic "Registrations," is of a type to which are sometimes added new articles related to the topic "Registrations." Selection of an indicator 295 causes the user's station 106 to initiate a request that newly-received or otherwise more recent information items relevant to the current search be forwarded or otherwise brought to the attention of the requesting user, through, for example, push or other technologies, by server system 101 or other suitable source.

Selection of the indicator 295 corresponding to the item "News Articles" shown in FIG. 5, for example, can cause system 100 to open on the user's display device an interactive interface adapted to permit the requesting user to specify details of the request, including for example a frequency of checking for or delivering new responsive items, the format in which delivered items are to be provided, the addresses of files, e-mails, etc., to which delivered items are to be sent, etc. Suitable systems, devices, and methods for providing updated information in accordance with this aspect of the invention are disclosed in the incorporated references.

Interface 224 of FIG. 5 further comprises selectable items and function buttons 272, 305, 307, 309, 311, and 313, to assist the user in processing search results.

Selectable item boxes 272, corresponding respectively to each of the displayed information items 324, enable a user to identify respective displayed items 324 for further processing using functions such as those initiated using buttons 305, 307, 309, 311, and 313. An item 324 can be designated for further processing by the user by placing a cursor over the corresponding box 272 and activating the mouse button or other pointer selection device. Designation of an item by such means can be indicated on the display screen 224 by, for example, causing an "X" or other mark to appear in the selected box, or to change the displayed color of the interior of the box, etc. Selected items may be de-selected, or returned to an unselected state, by selecting the corresponding box 272 a second time.

Function button 307 can be used to select all displayed information items 324. For example, in order to mark all four items 324 displayed in FIG. 5 as selected, a user may select function button 307 using the cursor and a pointer selection device. Items not desired to be selected may be selected along with any desired items in this manner, and then de-selected individually by selecting the corresponding box(es) 272.

Function button 305 can be used to request delivery of hard copies of selected information items 324. For example, selection by the user of button 305 can cause system 100 to display on the user's display device an interactive interface for eliciting delivery details such as address(es), document formats, priority, courier service, and other parameters, and to complete the request for delivery.

Function button 309 can be used to request printing of selected information items at a device and in a format designated by the requesting user. For example, selection by the user of button 309 can cause system 100 to display on the user's display device an interactive interface for eliciting delivery details such as address or other communications information for a printer or printers associated with the user's station 106, document formats, resolution, numbers of copies, and other parameters, and to complete the request for printing.

Function button 311 can be used to request delivery of selected information items by e-mail, at addresses and in formats designated by the requesting user. For example, selection by the user of button 311 can cause system 100 to display on the user's display device an interactive screen for eliciting delivery details such as address or other communications information for e-mail recipients of the information, document formats, and other parameters, and to complete the request for delivery of the information.

Function button 313 can be used to request downloading of selected information to electronic files on computers associated with the user's station 106 or otherwise designated by the requesting user. For example, selection by the user of button 313 can cause system 100 to display on the user's display device an interactive screen for eliciting delivery details such as file names and locations, device types or software compatibility/format parameters, and other parameters, and to complete the request for delivery of the information.

In interface 224 of FIG. 5, index 216 of selectable items 220, information items 324 associated with a selected index item 322, and hierarchical index 230 of selectable items representing previously-selected levels of the index 216 are presented at the same time on at least one display device, and are thus concurrently displayed on at least one display device. Moreover, selectable items 220, information items 324, and hierarchical index 230 are displayed in a single window. As is understood by those of ordinary skill in the arts, a window is a separate viewing area on a computer display screen in a system that allows multiple viewing areas as part of a graphical user interface (GUI), and can usually be manipulated by, for example, resizing, moving, etc., independently by the display user, through stretching on any side, minimizing, maximizing, and closing. As will be readily understood by those of ordinary skill in the arts, any one or more of selectable items 220, information items 324, and hierarchical index 230 may be displayed in separate windows, and each window may be displayed on one or more display devices, independently of the others. For example, one or more windows comprising index display 216 of selectable items 220, information display 246 of information items 324, and/or hierarchical index 230 may be displayed in one or more separate windows on each of the two monitors shown with user system 763 of FIG. 1.

In some embodiments of the invention selectable items 220, information items 324 associated with a selected index item 322, and hierarchical index(es) 230 of selectable items representing previously-selected levels of the index 216 are presented at the same time on more than one display device, preferably linked with one user station 106. For example, index 216 and hierarchical index 230 may be displayed on one screen of a dual-panel display device, with associated information items being displayed on an adjacent second panel. Any combination suitable to the needs of the searching or requesting user, making use of any number of display devices, will serve. For example, one display device may be used to display one or more levels of an index 216, a second display a hierarchical index, and one or more associated displays information items associated with selected index terms.

Displayed information items 324 can comprise links such as hypertext links to documents associated with the information items. For example, the first two displayed information items 324 of FIG. 5 comprise links in the form of citations to cases decided by federal courts; the links, when activated using a selecting device such as a pointer as described herein, causing system 100 to retrieve and display on at least one display device associated with the requesting user's station 106 further information associated with the links, the further information comprising for example content such as the text of the opinions as issued by the courts. For example, as shown schematically in FIG. 4, selection of the first of items 324 of FIG. 5 results in presentation at a display device of a user interface screen 350 such as that shown in FIG. 6.

Figure 6:
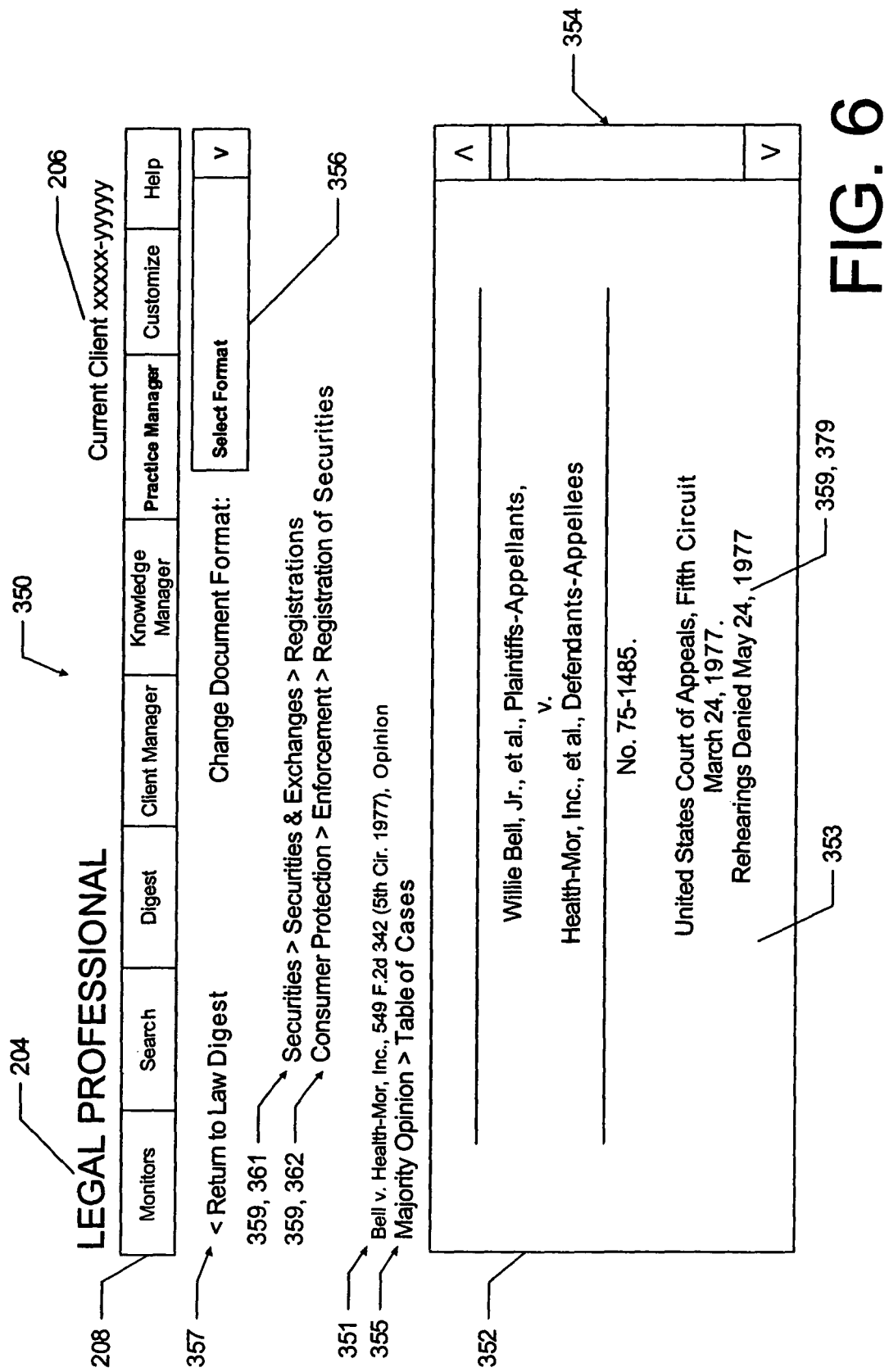

As shown in FIG. 6, interface 350 comprises item 351, which echoes the selection made by the user and provides an identifier for the content of the displayed information item. In field 352 content 353 associated with the selected data item is displayed. There being too much content 353, in the example illustrated in FIG. 6, associated with the information item identified at 351 to permit full simultaneous legible display in field 352, a scroll bar 354 or other device for viewing and/or accessing other portions of the content is provided.

At 355 selectable link items are provided for causing the portion of content 353 displayed in field 352 to be shifted to other locations within the displayed document. In the example shown, sections for the majority opinion and for a table of cases cited of the case presented are provided. Selection of one or the other of the items 355 causes the text shown in field 355 to be shifted to the top of the selected section.

At 357 a selectable item providing a link to the Law Digest index is provided. Selection of link 357 may result in, for example, a return to the beginning of an index search, through display of a top-level topics screen such as that shown in FIG. 2, or in the return of the user to some other previously-presented interface screen, such as the last previous point in the user's index search before the selected content was displayed. For example, if interface 350 was displayed in response to selection of the first of items 324 in FIG. 5, selection of item 357 may result in repeated presentation of interface 224 of FIG. 5.

At 356 the user is provided with a pull-down menu offering options for requesting that content 353 be displayed in any of various formats. For example, the user may be provided the option of having content 353 displayed in a printable format, a full-screen print-preview format, or many other formats, many of which are known and used in various data processing applications.

Displayed information in interface 350 may comprise, in content field 353 or elsewhere, selectable items 359 causing display of further information, or Initiation of various functions such as search options, including for example refreshing of interface 224, as shown in FIG. 4. Selectable links be provided, for example, to cause display of various related topics of index 216 or other indexes, or of other opinions or documents, to other information items, or to cause initiation of other computer or data processing applications.

The provision within displayed information screen 350 of links 359 can provide, for example, for improved searching of indexes of information. For example, selectable link items may be included in one or more hierarchical indexes of topics such as hierarchical indexes 361 and 362 of FIG. 6. Each of the hierarchical indexes 361, 362, may be similar in form and function to hierarchical indexes 230 of FIGS. 3 and 5. Where a displayed information item may be classified within or otherwise associated with more than one topic of an index, for example, a separate hierarchical index may be provided for one or more topics with which the information is associated. For example, a document such as the opinion identified by item 351 can be classified in subtopics pertaining to both "Securities" and "Consumer Protection", as shown at hierarchical indexes 351, 352. Selection of any of the items in 351, 352 pertaining to an index topic can result in display of a user interface screen such as that shown in FIG. 5, with portions of the index 216 relevant to the selected item and any associated information being displayed. Thus a user of a search system 100 may use an index of selectable items representing index topics to identify relevant information, review or otherwise access the information, and browse or otherwise navigate to a different point in the same index, or in a different index, with immediate and concurrent display of different or overlapping associated information, e.g. search results, to continue a search.

Links to index topics, related information items such as related or cited judicial opinions, other news articles, relevant statutes, etc., can also be embedded within displayed text content, such as within field 353. Such links can be used to conduct or enhance index-based and other forms of searching, as described herein. For example, selection of link 379 "Rehearings Denied May 24, 1977" can result in display of the content of a document associated with that denial of the rehearing, such as a court order.

Links to index topics, other documents, etc., may also be provided in concurrently-displayed information items, such as any one or more of items 324 of FIG. 5, to provide any or all of the functionality described herein.

Selectable items 324 may also comprise identifiers of lists of information items identified by the search system 100 in response to selection of an index item or in response to another search query, as described herein. For example, the item 324 "News Articles" of FIG. 5 can comprise a link to a list of articles stored in one or more of database(s) 121. Selection of such an item 324 can result, as shown in FIG. 4, in presentation at the user's display device(s) of a user interface screen 543 comprising a list of one or more responsive information items, which may comprise identifier such as selectable items comprising suitable titles, summaries of content, or full content of responsive information items.

Figure 7:
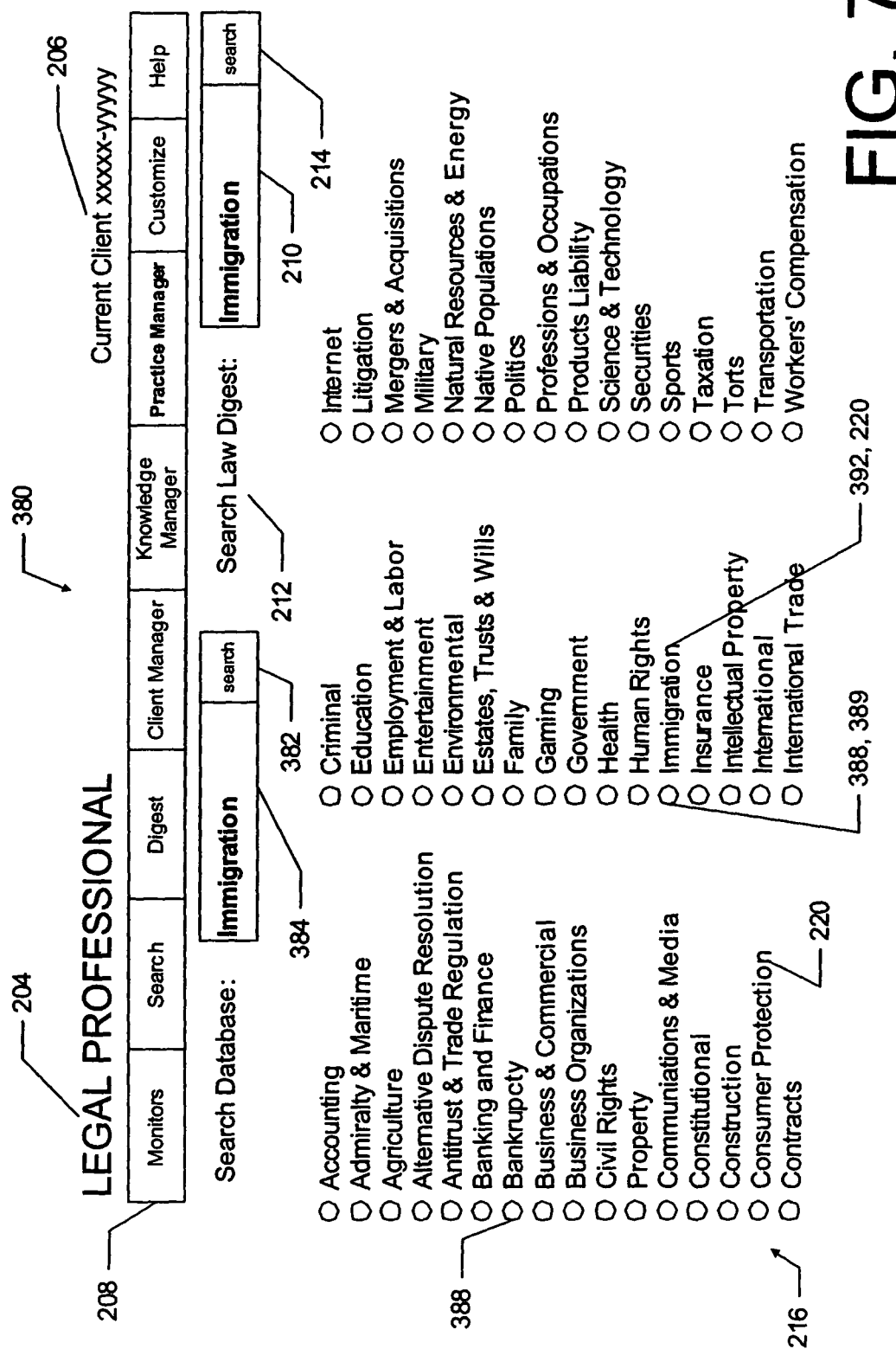

The invention provides many improvements for the formulation of automated searches of electronic databases. For example, FIG. 7 illustrates a user interface screen adapted for assisting the formulation of search queries using a topic index. User interface screen 380 illustrated in FIG. 7 comprises index 216 of selectable items 220 representing various subtopics within an index "Law Digest." Each of selectable topic items 220 is displayed with a selectable radio button item 388. Also shown are database and index search fields 384, 210. Selection of one of button items 388 causes system 100 to enter into either or both of search fields 384, 210, an identifier corresponding to the index item displayed with the selected radio. For example, as shown in FIG. 7, selection of button 389 adjacent to index item 392 "Immigration" causes a search term "immigration" to be entered automatically in both of fields 384, 210, for use by system 100 in searching database(s) 121 and/or the complete index "Legal Digest", including all topics and subtopics. A user may add further search terms, and/or Boolean or other logical connectors, by placing a cursor in the desired field 382, 210, and typing or otherwise entering desired terms, and may cause a search of the database and/or index to be executed by selecting the relevant "search" function item 382, 214. Upon selection of one of buttons 382, 214, system 100 uses the entered search terms to search database(s) 121 and/or index 216 for relevant data, and returns relevant information in any desired manner, as for example by listing on a display device screen, with or without indexes or other data or information, or by printing, e-mailing, etc.

Another improvement in search capability provided by the invention includes joint or group creation, refinement, use, and saving of search queries, including index searches, and storage and sharing of search results. For example, a user of any user station 106 may create a search query by browsing one or more levels of an index, as herein described, and/or by entering search terms at item 214 and filters using item 256. The selection of various index topics and designation of filter parameters may be used by system 100 to construct such a search query. For example, as shown in FIG. 4, a user may, by selecting FILTER item 256, invoke a user interface 450 adapted to accept input of suitable filter parameters, including for example ranges of dates associated with information items to be retrieved in response to the search, such as publication or issue dates; jurisdictions of legal entities, such as the various state or federal courts; the source(s) of information, such as the author, publisher, or processor of a document; and the type of content to be retrieved, such as legal opinions, statutes or regulations, commentary, or news articles, etc. By selecting an item such as SAVE MASK/ SEARCH item 452 the user can cause the search query, or mask, to be saved in non-volatile storage, for example at one or more user stations 106 or at server 101. Preferably a saving user may associate with the search query one or more unique identifiers, preferably designated by the user. In preferred embodiments the user is further enabled to designate a group of other system users with whom the user wishes to share access to the stored search parameters and any results obtained from completing the search.

In preferred embodiments, stored searches may be accessed and/or edited by any of the authorized users designated by the search creator, and automatically re-run, at intervals or times specified by the requesting user. For example, a user who has constructed a search query may select a CUSTOM INDEX item such as item 252 of FIG. 4, and, using a suitable interface 652, review and/or edit a saved set of search parameters which will, when submitted by the user to the search system, cause system 100 to execute a search in accordance with the parameters of the query, and display a screen such as interface 224, showing relevant index and/or information items from database(s) 121. The user may further enter data indicating that the search is to be re-run on a periodic basis, or upon occurrence of defined events; and may designate e-mail or other addresses, such as the monitors described in the incorporated references, for delivery of document lists or other search results.

Parameters associated with saved searches may include, for example, a title for the search, to serve as a mnemonic device for the user(s) authorized to access the search; a description of the search details; the date(s) that the query was created, modified, and processed as a search; a frequency with which the search is to be re-run automatically; one or more e-mail or physical addresses to which results are to be sent; a preferred format for delivery of documents, or a set of formats for different types of documents; date ranges over which the search is to be run or of documents to be considered for results; jurisdictions from which results are to be sought; sources, such as particular databases, publishers, authors, etc., from which results are to be sought; and frequencies with which updates, if any, of updatable information types are to be provided.

User interface screens for displaying indexes and associated information, and for other functions in implementing the invention may be created using structured data sets, such as data sets created or implemented in markup languages such as HTML or XML, with or without data fills to supply changing variable data or information; using general purpose or specialized programming, such as routines adapted for identifying and formatting data for display; or in any other manner consistent with the purposes of the invention.

For example, index displays 216 and information displays 246 may be created using XML coding. In such an embodiment of an index display, each part of the an index or other display that is to be displayed together, or as a set, may be included in a separate, pre-configured data set, or document. For example, each topic level of an index such as the Law Digest index of FIG. 2 may be included in a structured document, with each item in a displayed level comprising a link such as a hypertext link to another structured document representing one or more levels of topics subordinate to a selected topic. For example, selection of top-level item 222 "Securities" in FIG. 2 can comprise a hypertext link to an XML structured document representing the second-level index of subtopics subordinate to "Securities," as shown at 216 in FIG. 3.

Figure 8:
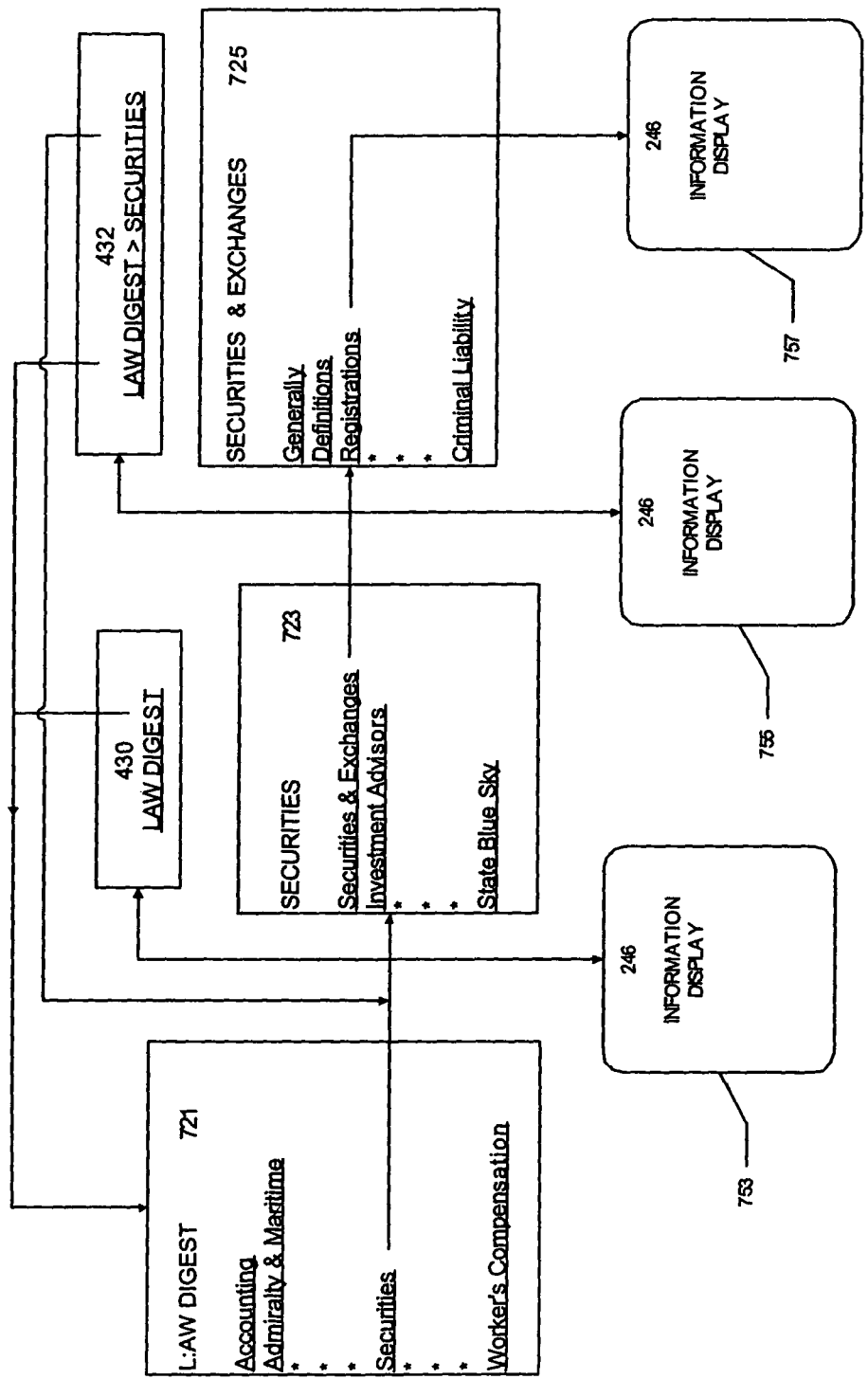
FIG. 8 is a schematic diagram of an embodiment of a process used for creation of user interface screens according to the invention.

An embodiment of a process for creation of index and information displays according to the invention is illustrated schematically in FIG. 8. A user of a research system 100 invokes an introductory index-searching interface, such as screen 200 of FIG. 2. As part of the process of displaying user interface screen 200, system 100 access a structured data file or document 721, which contains XML code for the topmost level of the Law Digest index, including the data corresponding to hypertext links comprising tags or labels for index topics Accounting, Admiralty & Maritime . . . Securities, . . . Worker's Compensation, as shown in FIG. 2. System 100 causes the XML document 721 to be displayed in index display 216 as illustrated in FIG. 2.

Upon selection of item 222 "Securities", the system accesses an XML data file 721 corresponding to the first level of subtopics subordinate to the index topic "Securities," and causes data contained therein to be displayed in an index display such as 216 in FIG. 3. Concurrently with the process of displaying the index display 216, system 100 causes search engine(s) 120 to search database(s) 121 for information items associated with topic "Securities". Any information items identified by the search engine(s) as associated with the selected term are displayed in an information display 246, 753 as illustrated in FIG. 4 and schematically in FIG. 8. Also concurrently with the process of displaying the index display 216, system 100 causes a hierarchical index 430 comprising a selectable item "Law Digest" to be displayed, as for example hierarchical index 230 of FIGS. 3 and 4.

Upon selection of item 242 "Securities & Exchanges" from data file 723, the system accesses an XML data file 725 corresponding to the second level of subtopics subordinate to the index topic "Securities & Exchanges," and to the first level of subtopics subordinate to the topic "Securities & Exchanges," and causes data contained therein to be displayed in an index display such as 216 in FIG. 3. Concurrently with the process of displaying the index display 216, system 100 causes search engine(s) 120 to search database(s) 121 for information items associated with topic "Securities & Exchanges". Any information items identified by the search engine(s) as associated with the selected term are displayed in an information display 246, 755 as illustrated in FIG. 4 and schematically in FIG. 8. Also concurrently with the process of displaying the index display 216, system 100 causes a hierarchical index 432 comprising a selectable item "Securities" to be displayed, as for example hierarchical index 230 of FIGS. 3 and 4.

The process of accessing XML index topic documents and associated information, and presenting corresponding displays, continues until desired search results are displayed or until a bottom level of an index is reached.

At any time a user wishing to return to an earlier point in the search, corresponding to higher level of the index, may select one of the selectable items in hierarchical indexes 430, 432. Selection of an item "Law Digest" causes the system to access XML index data file 723 and display index data contained therein, and to search database(s) 121 for and display associated information, as described. Selection of an item "Security" causes the system to access XML index data file 725 and display index data contained therein, and to search database(s) 121 for and display associated information, as described.

FIGS. 9-15 are schematic diagrams of user interfaces useful in implementing further embodiments of the invention.

FIGS. 9-13 illustrate user interfaces useful for creating sets of search parameters using various combinations of input processes, and in initiating and executing searches using created search term sets, and in reviewing and/or otherwise processing search results.

Figure 9:
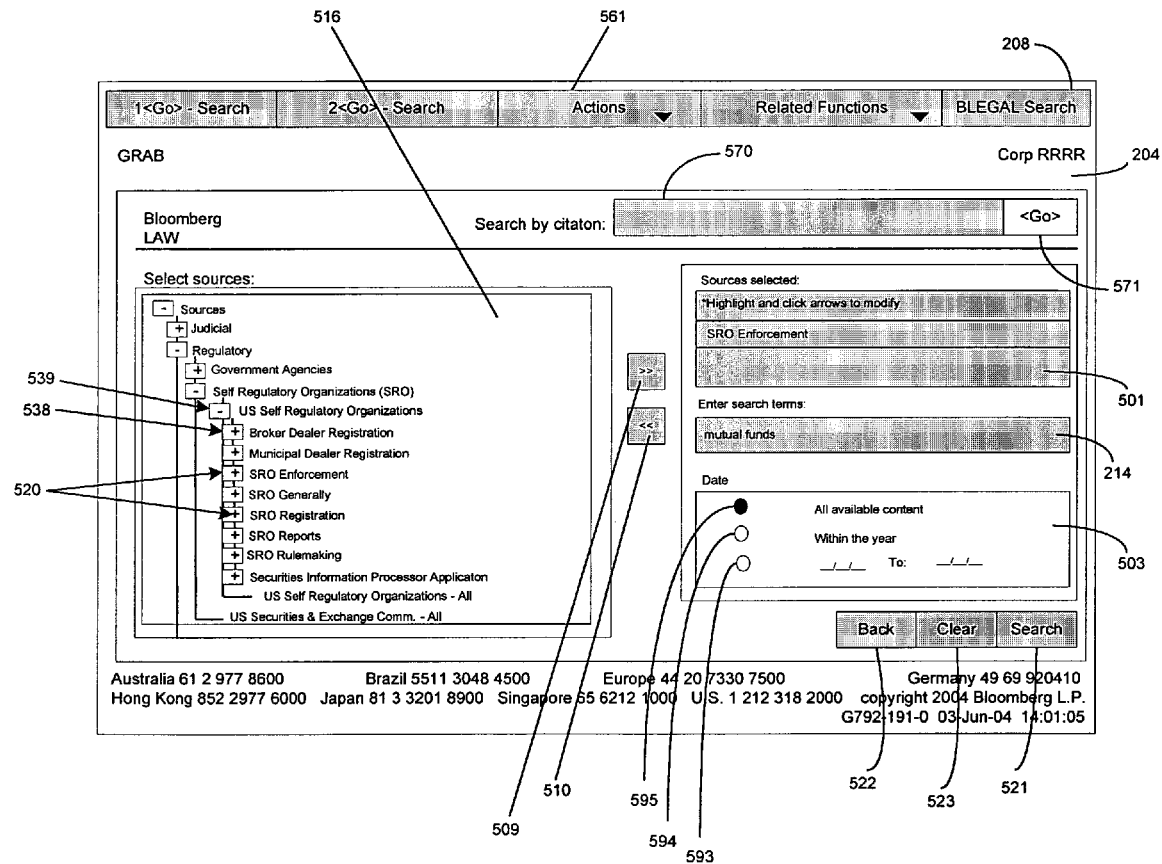
FIGS. 9-18 are schematic diagrams of user interfaces comprising data displayed at a user station according to further embodiments of the invention.

User interface screen 500 of FIG. 9 comprises display 516 of an index of selectable items 520 associated with sources, e.g. databases, of information that may be searched for information. Index 520 includes expansion and contraction items 538, 539 associated with corresponding index items 520 and useful for accessing desired lower levels of the index in a manner similar to that of items 238, 239 displayed in association with topical indexes, as described herein; and fields 501, 214, 503 for entry and display of various types of search parameters.

At field 501 identifiers associated with various sources, e.g. databases, selected for use in searching the system for information are displayed. Display of source identifiers in field 501 indicates that the identified sources have been designated for use in executing searches. Source identifiers may be added to field 501 by, for example, selecting corresponding index items 520 in display 516 and then selecting "add" item 510, or by double-clicking on the desired index item 520. An item may be removed from field 501, i.e., deleted from the set of parameters to be used in executing a search, by selecting the corresponding item in field 501 and then selecting "remove" item 510. For example, in FIG. 10, "SRO Enforcement" item 511 associated with source subgroup 512 "US Self Regulatory Organizations" of group "Self Regulatory Organizations" 513, which is a part of the "Regulatory" and "Sources" groups 514, 515, of source index 516 has been selected. Selection of the item is indicated by use of highlighting bar 517, which may be of a suitable distinguishing color. Selection of "add" arrow 509 in the screen of FIG. 10 would cause a corresponding item "SRO Enforcement" to appear in Field 501.

Search terms such as key words or other terms of interest may be entered in field 214 and used as filters in searching the source(s) designated in field 501 by, for example, typing using a keyboard, or otherwise inputting them as described herein. Date restrictors of various types may be designated by selection of corresponding items in field 503, such as radio buttons items 593, 594, 595. In the embodiment shown, searches may be unrestricted, with respect to dates, by, for example, selection of item 593; or may be restricted to information items associated with dates in designated years by selection of item 594, or within designated date ranges by selecting item 595 and entering desired dates. (In FIGS. 9-13 selectable radio button items are shown in disproportionate size, due to anomalies in printing). Other types of date restrictors may be provided or used, including, for example, other periods, such as weeks or months, or all dates before or after designated dates.

When all desired search parameters have been set, the user may select "search" item 521 to initiate a search using any designated search terms and dates to search the selected sources 520. Selection of "back" item 522 may cause the set of designated search parameters to return to a former state, for example, a default or otherwise saved state. Selection of "clear" item 523 may cause the set of search parameters to be cleared, so that no parameters are designated. Optionally a search initiated without designated search parameters may result in identification of all information items within the available database.

Figure 10:
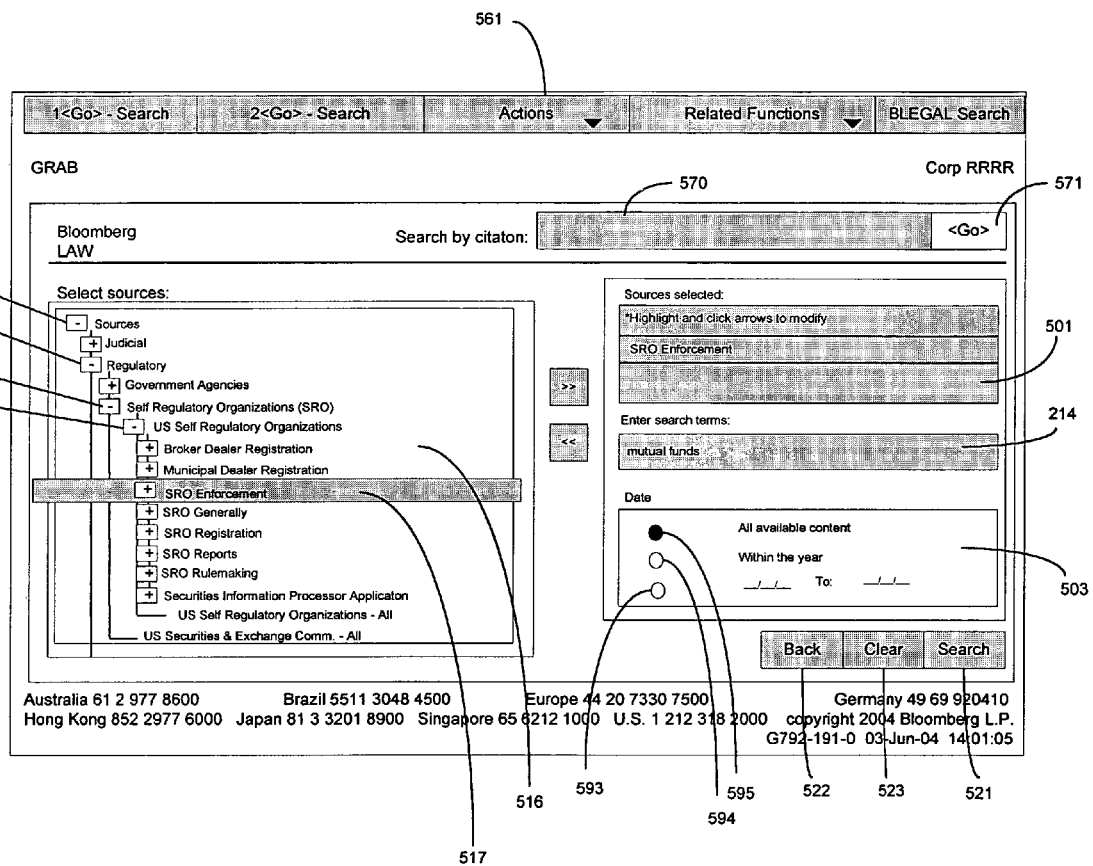
Figure 11:
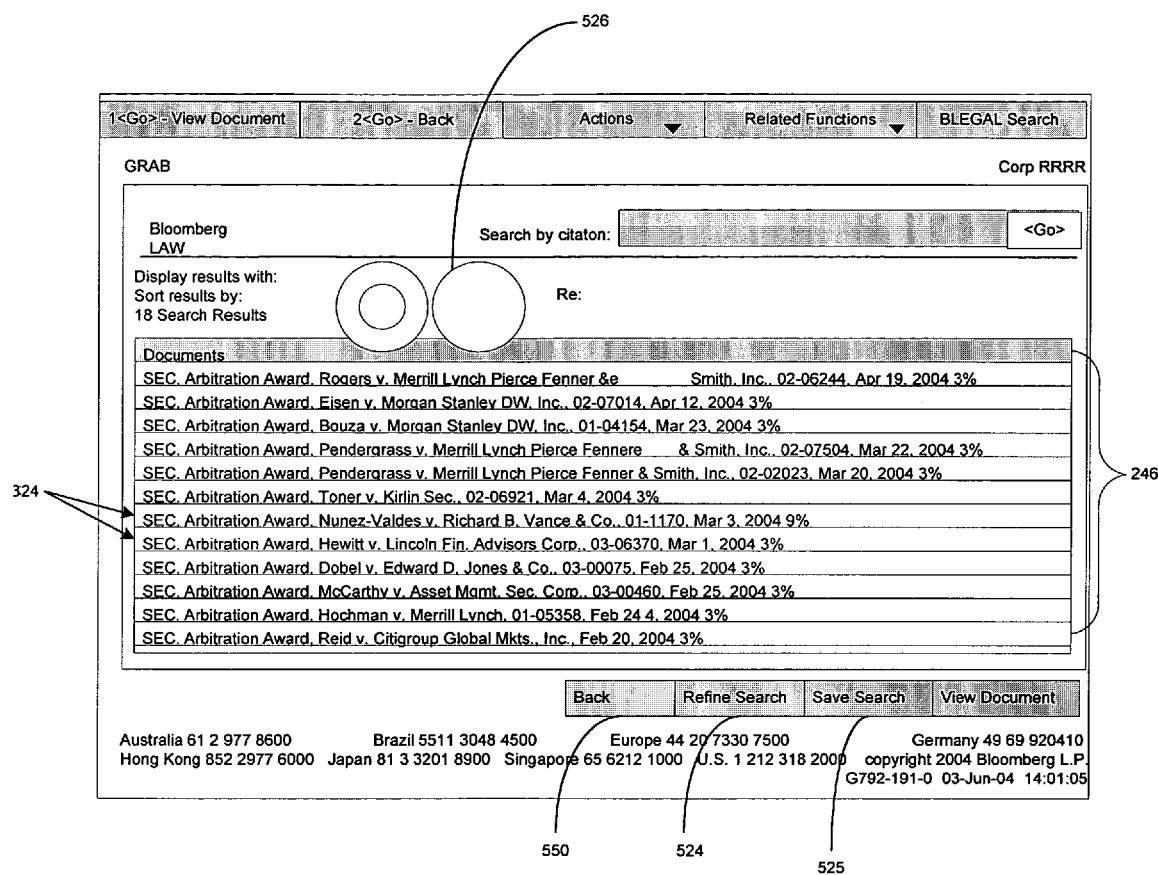

Selection of "search" item 521 of FIG. 9 or 10 causes a search to be executed, using designated terms, date ranges, and other parameters, of any designated sources; and subsequent display in a field 246 of information items 324 corresponding to the designated search parameters, as shown for example in FIG. 11. Information items 324 may comprise, for example, one or more of the features herein described.

In results display 550 of FIG. 11, items 524 and 525 are provided for refining search and saving search logic, i.e., sets of designated search parameters, for example using processes described herein. Items 526, e.g., selectable radio button items, are provided to enable further filtering of search results using preselected criteria.

Any one or more of information items 324 displayed as a result of an executed search may be associated with various forms of information content. For example, in the embodiment shown in FIG. 11, selection of an information item 324 can result in display of content corresponding to an image of a document, as shown in field 551 of FIG. 12. By using items 553, a user may designate whether to view, and subsequently store, print, or otherwise manipulate, the information content in any of various formats, for example, HTML or Adobe Acrobat (.pdf) format. Any suitable format or combination of formats may be provided, as described herein. Items 554 are provided to allow a user to scroll through content associated with a set of information items 324 identified as a result of a search. For example, if by selecting an information item 324 in field 246 of FIG. 11 a user has caused content 551 of FIG. 12 corresponding to the selected information item 324 to be displayed, the user may cause content associated with a preceding or succeeding item 324 to be displayed in Field 551 without reverting to screen 550 of FIG. 11; instead, the content associated with the preceding or succeeding item is displayed in a field 551 in the same or a different display, as for example by refreshing or overwriting the screen or displaying the content in a new window, by selecting the "previous document" or "next document" item, as desired. Scroll bar 592 is provided for viewing portions of the content not currently displayed By selecting "Launch Viewer" item 556 in FIG. 12 the user can cause content displayed in field 551 to be displayed in a new window, without any undesired tool bars, etc., as for example as a plain document display in which more content is visible due to fewer viewing restrictions imposed by, for example the previously displayed toolbars, or in any other suitable format, as for example in a separate program or application designated by the user. A user may be enabled to preset configurations designating the format of content so viewed, for example, by designating a desired document viewing format or a desired viewing program to be used as a default.

Figure 12:
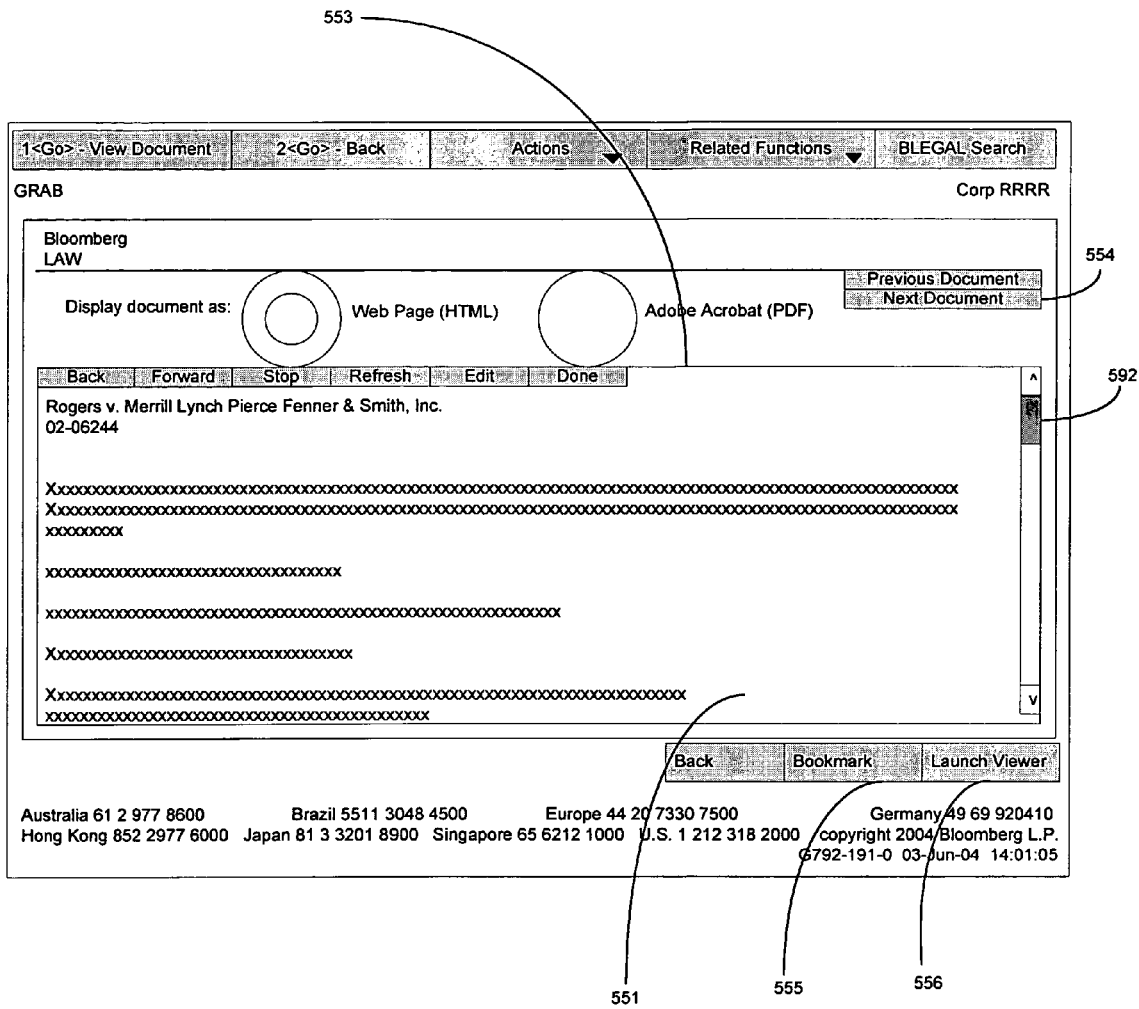
Figure 13:
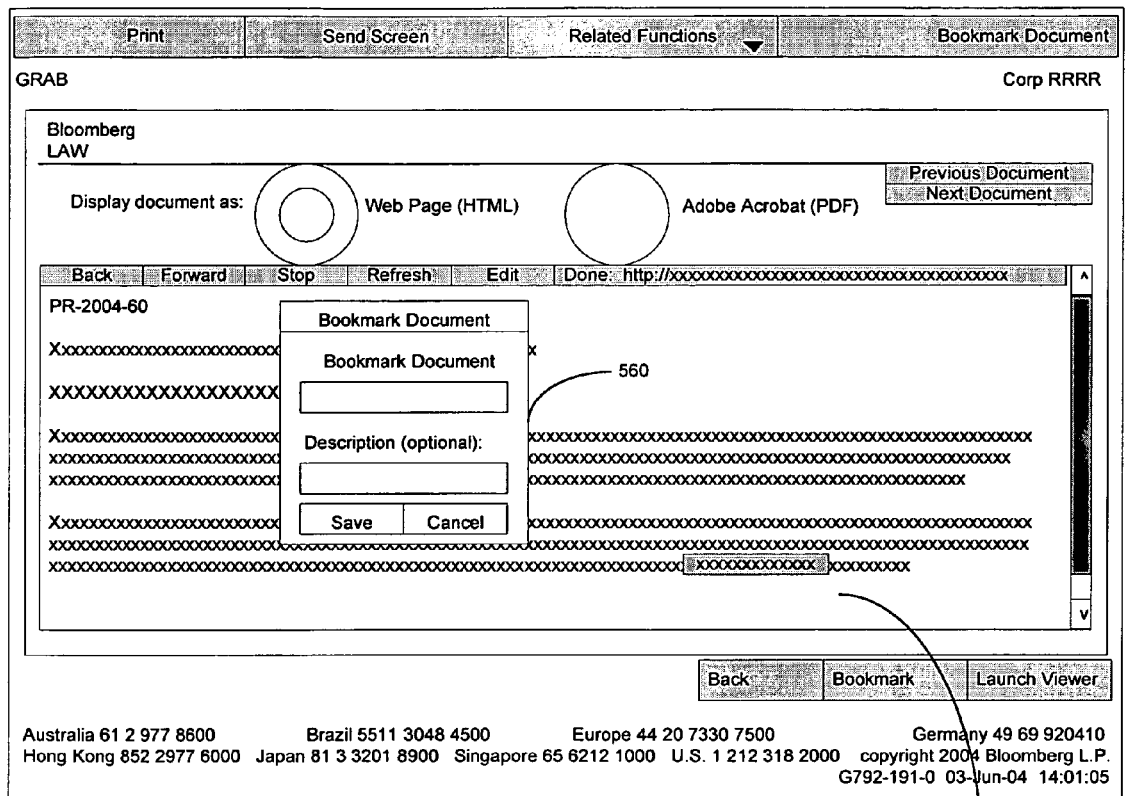

By selecting "Bookmark" item 555 in FIG. 12 the user may create and store data useful for quickly and easily retrieving content associated with a desired information item 324. For example, selection of "Bookmark" item 55 may result in the display of a pop-up or other interface window such as window 560 of FIG. 13, which provides fields for use in inputting text strings to be used as labels, i.e., "Bookmark Name" and optionally other descriptions. Any designated labels or other information may be saved in conjunction with or otherwise associated with the content. At any time thereafter a user may access content associated with the bookmarked information item 324 by, for example, accessing "Actions" item 561 of the screens shown in FIG. 9 or 10. Selection of "Actions" item 561 can result in presentation of a pull-down or other menu comprising an item "Bookmarks", selection of which causes display of a screen including a list of previously-defined bookmarks, the selection of any of which results in display of the corresponding content in a window such as, for example, that of field 551 of FIG. 12.

Other search options may be provided. For example, field 570 of FIGS. 9 and 10 enable a user to enter a document citation such as a legal citation to a published judicial decision or a citation to a published reference work; following which selection of "Go" item 571 results in display of content or other information associated with the citation, for example, in a field 551 as shown in FIG. 12. For example, entry of a citation "383 U.S. 1" can result in retrieval and display of the 1966 judicial decision of the United States Supreme Court in *Graham v. John Deere Co.*, reported at 383 U.S. 1 and 148 U.S.P.Q. 459.

Figure 14:
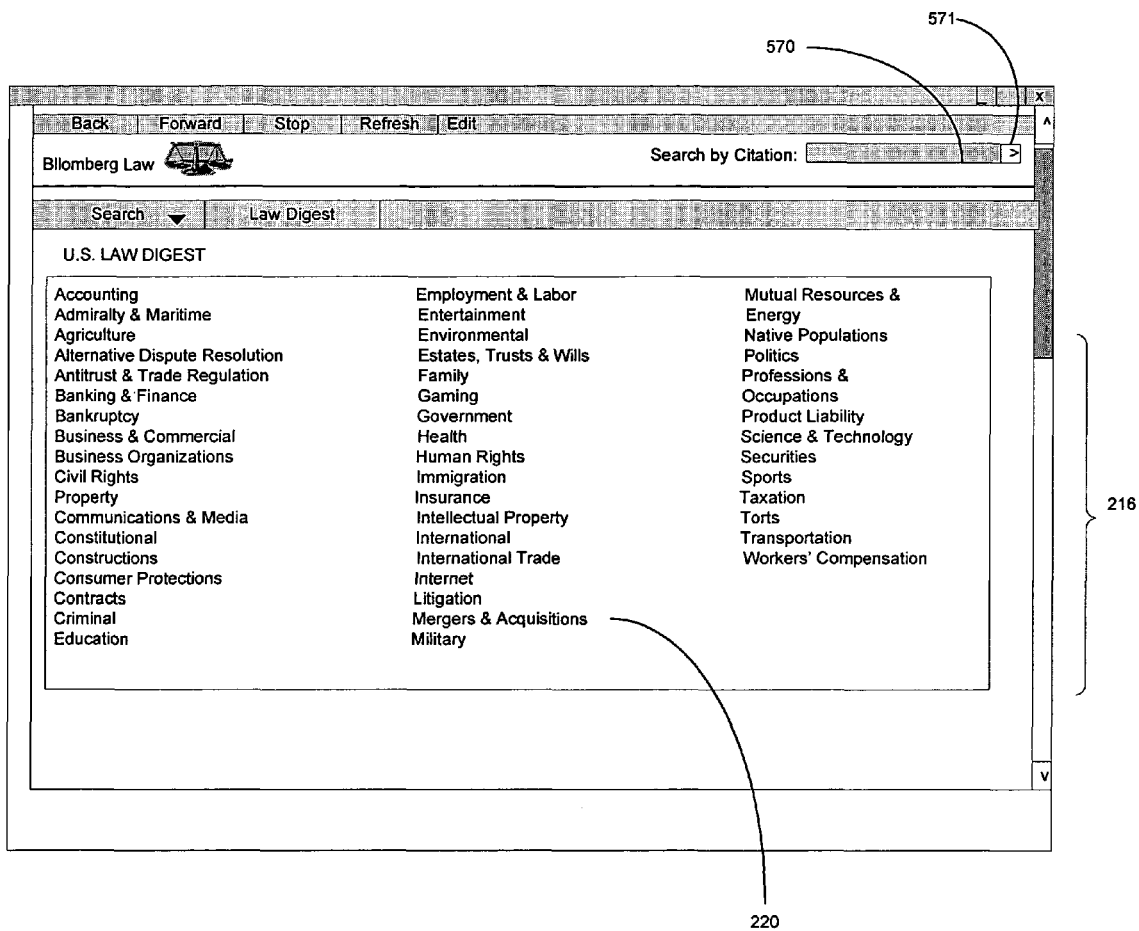
Figure 15:
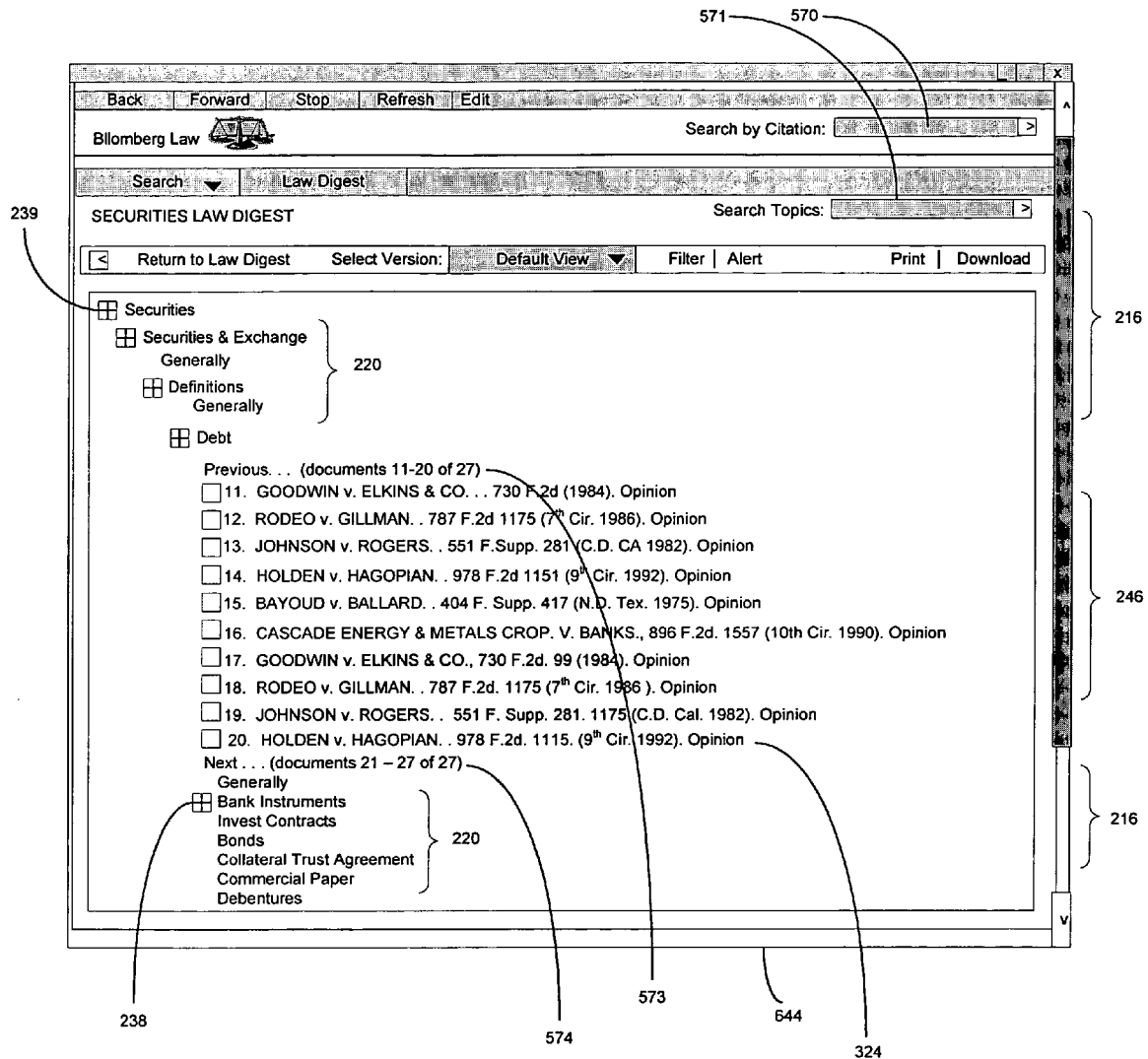

FIGS. 14-15 illustrate user interfaces useful in searching topical indices such as indices 216, in which content associated with index items is displayed together with the index items, in an embedded form.

FIG. 14 shows an interface screen comprising a high-level index display 216 similar in form and functionality to that shown in FIG. 2. Selection of top-level index item 220 "Securities" of FIG. 14 results in display of an index tree 216 such as that shown in FIG. 15. Index tree 216 of FIG. 15 comprises selectable items 220 corresponding to the selected item "Securities" and at least a first level of lower index items, e.g., "Securities & Exchanges", which may be associated with expansion and contraction items 238, 239, respectively. Selection of expansion/contraction items 238, 239 results in display or removal of additional lower-level items 220, as described above.

Expansion or other selection of an item 220 associated with one or more information items 324 by use of an expansion item 238 results in concurrent display of associated information items in conjunction with the index item 220 with which the information is associated, so that for example the information items are presented adjacent to the selected index item in a manner similar to items a next lower level of the index. For example, in FIG. 15 information items 324 associated with index item 220 "Debt" are displayed between the item 220 "Debt" and the next item at the same level of index 216, item 220 "Generally". Display of associated information items 324 in this manner may be referred to as "embedded" display.

Where as shown in FIG. 15 an index item 220 is associated with more information items 324 than may be displayed on a single user interface screen 644, any suitable mechanism for indicating that additional associated information items are available but not displayed, and preferably for providing access to such undisplayed items, may be provided. For example, as shown in FIG. 15, items 11-20 of a set of 27 associated information items are displayed, together with selectable items 573, 574, which may be selected in order to initiate display of previous or subsequent information items, respectively. Alternatively, a scroll bar associated with the item list may be provided; or other means of allowing the user to access the undisplayed items may be provided.

Figure 16:
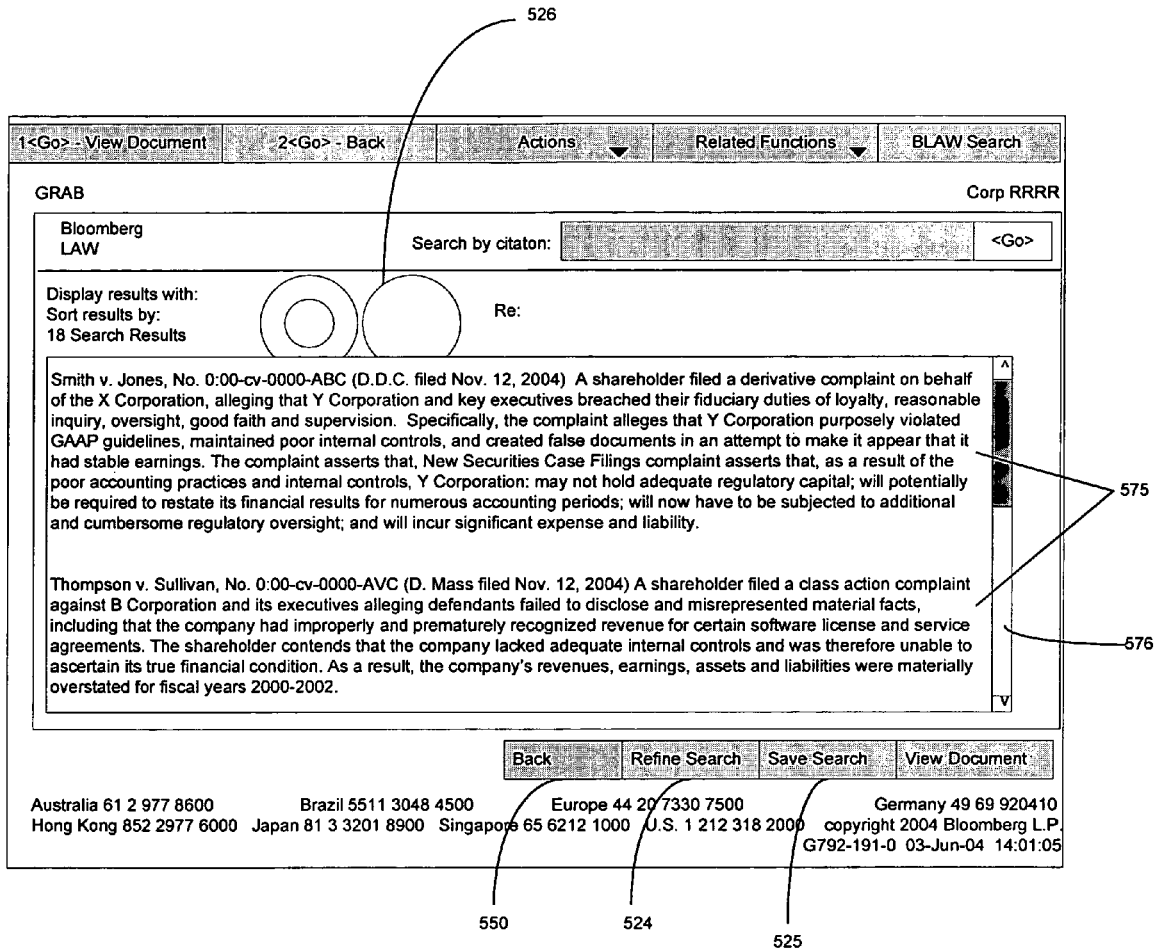

FIG. 16 illustrates another embodiment of a user interface for listing the information items resulting from a search. In this embodiment, information items 575 may comprise, for example, summaries or descriptions of documents or other content that match the search parameters. These summaries or descriptions may consist of editorial summaries of the content or automatically-extracted excepts from it. Scroll bar 576 allows the user to view summaries that do not fit within the allotted area of the display.

The user interface illustrated in FIG. 16 resembles the user interface illustrated in FIG. 11. Depending on the embodiment, the user may or may not have the ability to switch back and forth between these two interfaces following a search.

In results display 550 of FIG. 16, items 524 and 525 are provided for refining search and saving search logic, i.e., sets of designated search parameters, for example using processes described herein. Items 526, e.g., selectable radio button items, are provided to enable further filtering of search results using preselected criteria.

Any one or more of information items 575 displayed as a result of an executed search may be associated with various forms of information content. For example, in the embodiment shown in FIG. 11, selection of an information item 575 can result in display of content corresponding to an image of a document, as shown in field 551 of FIG. 12, which has been discussed previously.

Figure 17:
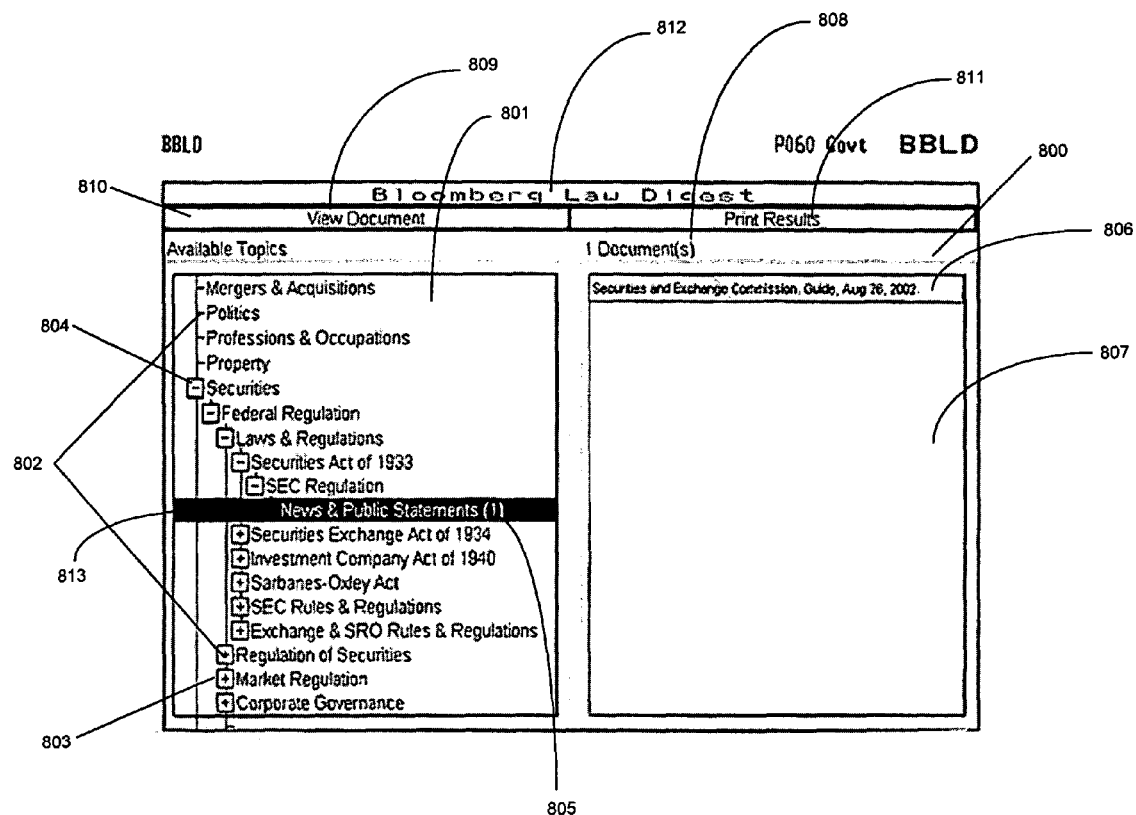
Figure 18:
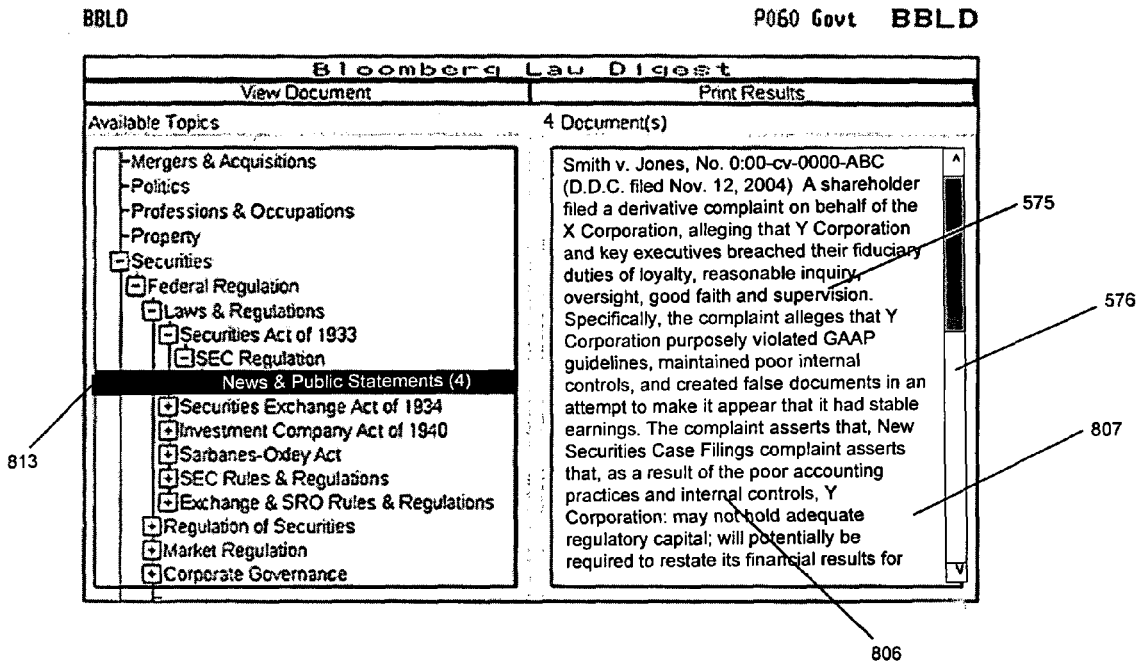

FIGS. 17-18 illustrate user interfaces useful for finding documents or other content relevant to a particular topic and selecting particular documents or content to view, print, store, or otherwise work with.

User interface screen 800 of FIG. 17 comprises display 801 of an index of topics 802 associated with sources of information such as databases. Screen 800 optionally includes a screen caption 812 that describes the service that the screen 800 provides access to. Index 802 includes expansion and contraction items 803, 804 associated with corresponding index items 802 and useful for accessing desired lower levels of the index in a manner similar to that of items 238, 239 displayed in association with other topical indexes, as described herein.

Some index items 802 may contain an integer greater than or equal to one enclosed in parentheses 805. The number indicates the number of information items 806 associated with that index item. In response to the user's selection of such an index item 813, the matching information items 806 will appear in the results area 807. The results caption 808 will also change to indicate the number of matching information items. If the results area is too small to contain all the matching information items, the results area 807 will include a scroll bar.

If the user selects an information item 806, the user may then view the document associated with it by selecting the View Document button 809 in the menu bar 810, which will, in some embodiments, display an image of the document in field 551 of FIG. 12. The user may also print the list of matching documents by selecting the Print Results button 811 in the menu bar 810.

FIG. 18 illustrates a different embodiment of this user interface, in which the results area 807 displays information items 806 that are summaries or descriptions of documents or other content that are associated with the user's chosen topic 813. Scroll bar 576 allows the user to view summaries that do not fit within the allotted area of the display. Depending on the embodiment, the user may or may not have the ability to switch back and forth between the interfaces described in FIG. 17 and FIG. 18 following a search.

It will be understood that the systems described herein include, either explicitly or implicitly, software implemented on computers or other appropriate hardware, for causing the computers to implement the processes disclosed. Programming and other data processing and/or control functions may be accomplished using any suitable devices, programming languages, compilation or coding techniques, etc. Programming for carrying out the methods, user interfaces and functionality disclosed herein can be constructed by those of skill in the art from the disclosure herein.

Methods and systems disclosed herein can be implemented by those of ordinary skill in the relevant arts from the disclosure herein, the incorporated disclosures, and conventional knowledge in the relevant arts.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modifications are intended to be included within the scope of the invention. Except to the extent necessary or inherent in the processes themselves, no particular order to steps or stages of methods or processes described in this disclosure, including the Figures, is implied. In many cases the order of process steps may be varied without changing the purpose, effect, or import of the methods described.

What is claimed is:

1. A method of presenting information stored on computer readable media on at least one display device with the aid of at least one computer and an input device for selecting information displayed on the at least one display device, comprising, in a presentation session:

the at least one computer causing the at least one display device to display thereon, from information stored in the computer readable media, a first plurality of selectable items from a first index that comprises a plurality of levels, at least one of the selectable items in the first plurality being from a different level of the index from at least one other of the selectable items in the first plurality, and, concurrently therewith, at least one selectable item in the first index not included in the first plurality of selectable items or in a second index;

in response to receiving via the input device selection of an item of the first plurality of selectable items, the at least one computer causing the at least one display device to display information related to the selected item of the first plurality of items concurrently with display of the first plurality of items and the at one least selectable item; and in response to receiving via the input device selection of the at least one selectable item, the at least one computer causing the at least one display device to display, in place of the first plurality of selectable items, a second plurality of selectable items, in the first index or in the second index, that is at least partially different from the first plurality of selectable items concurrently with display of at least one other selectable item that was previously selected in the presentation session;

wherein the first plurality of selectable items is displayed in a group such that it is visually apparent which selectable items are in the first plurality of selectable items and which selectable items are not, the first plurality of selectable items comprising all of the selectable items that are displayed in the group;

wherein the first plurality of selectable items is displayed in a manner that indicates the relative levels of the respective selectable items in the first plurality of selectable items;

wherein causing the at least one display device to display information related to the selected item of the first plurality of items comprises causing the at least one display device to display in association with the information displayed related to the selected item of the first plurality of items a source or sources of the information displayed, each source being a database or a publisher, and an indicator associated with each displayed source indicating a number of items of information of a respective source related to the selected item; and wherein, in response to receiving the selection of an item of the first plurality of selectable items, the computer system neither adds any selectable items to the display of the first plurality of selectable items nor removes any selectable items from the display of the first plurality of selectable items.

2. The method of claim 1, comprising the at least one computer causing the display of the first plurality of items, the at least one selectable item, and the information related to the selected item on a same display device.

3. The method of claim 1, comprising the at least one computer causing the display of the first plurality of items, the at least one selectable item, and the information related to the selected item on at least two display devices.

4. The method of claim 1, wherein the at least one selectable item comprises a plurality of items in a hierarchical first or second index consisting of items previously selected in the session.

5. The method of claim 4, wherein the information related to the selected item of the first plurality of items comprises a summary of at least one document stored in the computer readable media.

6. The method of claim 1, comprising the at least one computer causing the at least one display device to display at least one selectable item relating to information displayed on the at least one display device that can be updated with updated information, wherein in response to selection of the at least one selectable item, the displayed information is updated with the updated information.

7. A method of presenting results on at least one display device of a search for legal information stored on computer readable media with the aid of at least one computer and an input device for selecting information displayed on the at least one display device, comprising, in a presentation session:

the at least one computer causing the at least one display device to display thereon, from information stored in the computer readable media, a plurality of selectable items from an index of legal information that has more than one level, at least one selectable item in the plurality being from a different level of the index from at least one other selectable item in the first plurality;

in response to receiving via the input device selection of one of the plurality of selectable items, the at least one computer causing the at least one display device to display, concurrently with the plurality of selectable items, information associated with the selected one of the plurality of items; and the at least one computer causing the at least one display device to display, concurrently with and in addition to the plurality of selectable items and the displayed information, a hierarchical index of selectable items representing levels of the index previously selected in the session;

wherein the first plurality of selectable items is displayed in a group such that it is visually apparent which selectable items are in the first plurality of selectable items and which selectable items are not, the first plurality of selectable items comprising all of the selectable items that are displayed in the group;

wherein the first plurality of selectable items is displayed in a manner that indicates the relative levels of the respective selectable items in the first plurality of selectable items;

wherein causing the at least one display device to display information related to the selected item of the first plurality of items comprises causing the at least one display device to display in association with the information displayed related to the selected item of the first plurality of items a source or sources of the information displayed, each source being a database or a publisher, and an indicator associated with each displayed source indicating a number of items of information of a respective source related to the selected item; and wherein, in response to receiving the selection of an item of the first plurality of selectable items, the computer system neither adds any selectable items to the display of the first plurality of selectable items nor removes any selectable items from the display of the first plurality of selectable items.

8. The method of claim 7, wherein causing the at least one display device to display information associated with the selected one of the plurality of items comprises causing the at least one display device to display summary information.

9. The method of claim 8, wherein the hierarchical index of selectable items representing levels of the index previously selected in the session includes the currently-selected one of the plurality of selectable items.

10. The method of claim 7, comprising:

in response to receiving via the input device selection of a second one of the plurality of selectable items from the plurality of levels of an index of legal information, the at least one computer causing the at least one display device to display information associated with the second selected item.

11. The method of claim 7, comprising:

in response to receiving via the input device selection of the selected one of the plurality of selectable items, the at least one computer causing the at least one display device to display one or more selectable items from at least one level of the index of legal information subordinate to the level of the selected item.

12. The method of claim 7, wherein the plurality of selectable items and the information associated with the selected one of the plurality of items are displayed in two or more user interface areas of the at least one display device.

13. The method of claim 12, wherein at least one of the two or more user interface areas is displayed on a different display device.

14. The method of claim 7, comprising the at least one computer causing the at least one display device to display at least one selectable item relating to information displayed on the at least one display device that can be updated with updated information, wherein in response to receiving via the input device selection of the at least one selectable item, the at least one computer causes the displayed information to be updated with the updated information.

15. The method of claim 7, comprising the at least one computer causing the at least one display device to display, concurrently with the plurality of selectable items and the displayed information, at least one source of the displayed information and a plurality of selectable source-related items available from the source that are associated with the selected one of the plurality of selectable items, each source being a database or a publisher.

16. A method of presenting legal information stored on computer readable media on at least one display device with the aid of at least one computer and an input device for selecting information displayed on the at least one display device, comprising:

the at least one computer causing the at least one display device to display concurrently a first display comprising (a) a first plurality of selectable items from an index of legal information stored in a computer readable media that comprises a plurality of levels, at least one of the selectable items in the first plurality being from a different level of the index from at least one other of the selectable items in the first plurality, (b) information associated with a selected one of the first plurality of selectable items, and (c) a hierarchical index of selectable items representing previously-selected levels of the index of legal information;

in response to receiving via the input device a selection of a second selected one of the first plurality of selectable items, the at least one computer causing the at least one display device to display a second display, the second display comprising a plurality of selectable items representing at least a portion of the index of legal information corresponding to the second selected one of the first plurality of selectable items, information associated with the second selected one of the first plurality of selectable items, and a hierarchical index of selectable items representing previously-selected levels of the index of legal information, including the first selected one of the first plurality of selectable items; and in response to receiving via the input device a selection of one of the items of the hierarchical index, the at least one computer causing the at least one display device to display a third display comprising a plurality of selectable items representing at least a portion of an index of legal information corresponding to the selected item of the hierarchical index;

wherein the first plurality of selectable items is displayed in a group such that it is visually apparent which selectable items are in the first plurality of selectable items and which selectable items are not, the first plurality of selectable items comprising all of the selectable items that are displayed in the group;

wherein the first plurality of selectable items is displayed in a manner that indicates the relative levels of the respective selectable items in the first plurality of selectable items;

wherein causing the at least one display device to display information related to the selected item of the first plurality of items comprises causing the at least one display device to display in association with the information displayed related to the selected item of the first plurality of items
- a source or sources of the information displayed, each source being a database or a publisher, and
- an indicator associated with each displayed source indicating a number of items of information of a respective source related to the selected item; and wherein, in response to receiving the selection of an item of the first plurality of selectable items, the computer system neither adds any selectable items to the display of the first plurality of selectable items nor removes any selectable items from the display of the first plurality of selectable items.

* * * * *